US011613071B2

(12) United States Patent
Kuno

(10) Patent No.: US 11,613,071 B2
(45) Date of Patent: Mar. 28, 2023

(54) CYANATE ESTER KIT FOR A THERMALLY STABLE OBJECT

(71) Applicant: Stratasys Ltd., Rehovot (IL)

(72) Inventor: Lev Kuno, Tzur-Hadassah (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/561,764

(22) Filed: Dec. 24, 2021

(65) Prior Publication Data
US 2022/0118682 A1 Apr. 21, 2022

Related U.S. Application Data

(62) Division of application No. 17/280,956, filed as application No. PCT/IL2019/051070 on Sep. 27, 2019, now Pat. No. 11,235,511.
(Continued)

(51) Int. Cl.
*B29C 64/112* (2017.01)
*B33Y 70/00* (2020.01)
(Continued)

(52) U.S. Cl.
CPC ............ *B29C 64/112* (2017.08); *B33Y 70/00* (2014.12); *C09D 11/38* (2013.01); *B33Y 10/00* (2014.12); *C08L 79/04* (2013.01); *C09D 11/101* (2013.01)

(58) Field of Classification Search
CPC ....... B29C 64/112; B33Y 70/00; B33Y 10/00; C09D 11/38; C09D 11/101
See application file for complete search history.

(56) References Cited

U.S. PATENT DOCUMENTS 6,259,962 B1 7/2001 Gothait
6,569,373 B2 5/2003 Napadensky
(Continued)

FOREIGN PATENT DOCUMENTS

CN 103025506 4/2013
CN 103747943 4/2014
(Continued)

OTHER PUBLICATIONS

Notification of Office Action dated Oct. 21, 2022 From the State Intellectual Property Office of the People's Republic of China Re. Application No. 201980070060.1 and Its Translation of Office Action Into English with Summary. (6 Pages).
(Continued)

*Primary Examiner* — Michael M. Robinson

(57) ABSTRACT

A formulation system usable in additive manufacturing of a three-dimensional object that comprises, in at least a portion thereof, a cyanate ester-containing polymeric network, and additive manufacturing processes employing the formulation system are provided. Also provided are objects obtainable by the additive manufacturing and kits containing the formulation system. The formulation system includes a first modeling material formulation which includes a first curable material which is a thermally-curable cyanate ester and a second modeling material formulation which comprises an activating agent for promoting polymerization of the cyanate ester and is devoid of the first curable material, and further includes a second curable material which is different from the first curable material, and optionally an agent for promoting hardening of the second curable material.

25 Claims, 16 Drawing Sheets

Related U.S. Application Data

(60) Provisional application No. 62/738,084, filed on Sep. 28, 2018.

(51) Int. Cl.
  C09D 11/38 (2014.01)
  B33Y 10/00 (2015.01)
  C08L 79/04 (2006.01)
  C09D 11/101 (2014.01)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 6,863,859 B2 | 3/2005 | Levy |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 7,991,498 B2 | 8/2011 | Kritchman |
| 9,031,680 B2 | 5/2015 | Napadensky |
| 9,227,365 B2 | 1/2016 | Dikovsky et al. |
| 9,780,440 B2 | 10/2017 | Onaka et al. |
| 9,873,761 B1 | 1/2018 | Das et al. |
| 9,999,509 B2 | 6/2018 | Dikovsky et al. |
| 10,052,861 B2 | 8/2018 | Wang et al. |
| 2005/0101684 A1 | 5/2005 | You et al. |
| 2006/0192315 A1 | 8/2006 | Farr et al. |
| 2010/0191360 A1 | 7/2010 | Napadensky et al. |
| 2013/0040091 A1 | 2/2013 | Dikovsky et al. |
| 2016/0339643 A1 | 11/2016 | Dikovsky et al. |
| 2017/0106594 A1 | 4/2017 | Gardiner |
| 2017/0173886 A1 | 6/2017 | Menchik et al. |
| 2018/0117856 A1 | 5/2018 | Ochi |
| 2018/0243984 A1 | 8/2018 | Hayashida et al. |
| 2021/0268722 A1 | 9/2021 | Iwade et al. |
| 2021/0308938 A1 | 10/2021 | Kuno |
| 2021/0354398 A1 | 11/2021 | Pokrass et al. |
| 2022/0324179 A1 | 10/2022 | Pokrass |

FOREIGN PATENT DOCUMENTS

| | | |
|---|---|---|
| CN | 108136677 | 6/2018 |
| CN | 108350145 | 7/2018 |
| GB | 2507953 | 5/2014 |
| JP | 2002-292751 | 10/2002 |
| JP | 2015-112836 | 6/2015 |
| JP | 2015-168067 | 9/2015 |
| WO | WO 2009/013751 | 1/2009 |
| WO | WO 2011/021403 | 2/2011 |
| WO | WO 2013/128452 | 9/2013 |
| WO | WO 2016/063282 | 4/2016 |
| WO | WO 2016/125170 | 8/2016 |
| WO | WO 2017/040883 | 3/2017 |
| WO | WO 2017/068590 | 4/2017 |
| WO | WO 2017/134672 | 8/2017 |
| WO | WO 2017/134673 | 8/2017 |
| WO | WO 2017/134674 | 8/2017 |
| WO | WO 2017/134676 | 8/2017 |
| WO | WO 2017/187434 | 11/2017 |
| WO | WO 2018/055521 | 3/2018 |
| WO | WO 2018/055522 | 3/2018 |
| WO | WO 2020/065654 | 4/2020 |
| WO | WO 2020/065655 | 4/2020 |

OTHER PUBLICATIONS

Translation dated Nov. 10, 2022 of Notice of Reasons of Rejection dated Oct. 11, 2022 From the Japan Patent Office Re. Application No. 2021-516413. (4 Pages).
English Summary dated Aug. 2, 0302 of Notification of Office Action and Search Report dated May 24, 2022 From the State Intellectual Property Office of the People's Republic of China Re. Application No. 201980070060.1. (5 Pages).
Notice of Reasons of Rejection dated Oct. 11, 2022 From the Japan Patent Office Re. Application No. 2021-516413. (5 Pages).
International Preliminary Report on Patentability dated Apr. 8, 2021 From the International Bureau of WIPO Re. Application No. PCT/IL2019/051069. (8 Pages).
International Preliminary Report on Patentability dated Apr. 8, 2021 From the International Bureau of WIPO Re. Application No. PCT/IL2019/051070. (6 Pages).
International Search Report and the Written Opinion dated Jan. 14, 2020 From the International Searching Authority Re. Application No. PCT/IL2019/051069. (13 Pages).
International Search Report and the Written Opinion dated Jan. 24, 2020 From the International Searching Authority Re. Application No. PCT/IL2019/051070. (11 Pages).
Notice of Allowance dated Sep. 13, 2021 from the US Patent and Trademark Office Re. U.S. Appl. No. 17/280,956. (14 pages).
Office Action dated Oct. 28, 2021 From the Israel Patent Office Re. Application No. 281855 and Its Translation Into English. (6 Pages).
Official Action dated Nov. 18, 2021 from US Patent and Trademark Office Re. U.S. Appl. No. 17/280,324. (29 pages).
Bauer et al. "Cyanate Ester Based Resin Systems for Snap-Cure Applications", Microsystem Technologies, 8(1): 58-62, Mar. 2002.
Chandrasekaran et al. "3D Printing of High Performance Cyanate Ester Thermoset Polymers", Journal of Material Chemistry A, XP002796791, 6(3): 853-858, Published Online Dec. 20, 2017.
Stratasys "Safety Data Sheets for Objet RGD515", Stratasys, 1-10, Jan. 22, 2021.
Notification of Office Action and Search Report dated May 24, 2022 From the State Intellectual Property Office of the People's Republic of China Re. Application No. 201980070060.1. (8 Pages).
Notice of Allowance dated Mar. 3, 2022 from the US Patent and Trademark Office Re. U.S. Appl. No. 17/280,324. (6 pages).
Notification of Office Action and Search Report dated Jun. 22, 2022 From the State Intellectual Property Office of the People's Republic of China Re. Application No. 201980070055.0 and Its Translation of Office Action Into English. (11 Pages).

CYANATE ESTER KIT FOR A THERMALLY STABLE OBJECT

RELATED APPLICATION/S

This application is a Division of U.S. patent application Ser. No. 17/280,956 filed on Mar. 29, 2021, which is a National Phase of PCT Patent Application No. PCT/IL2019/051070 having International Filing Date of Sep. 27, 2019, which claims the benefit of priority under 35 USC § 119(e) of U.S. Provisional Patent Application No. 62/738,084 filed on Sep. 28, 2018. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to methods of three-dimensional inkjet printing employing a thermally-curable cyanate ester, and to objects obtained by these methods.

Three-dimensional (3D) inkjet printing is a known process for building three dimensional objects by selectively jetting building material formulation(s), via ink-jet printing head nozzles, onto a printing tray in consecutive layers, according to pre-determined image data. 3D inkjet printing is performed by a layer by layer inkjet deposition of building material formulation(s). Thus, one or more formulations are dispensed in droplets from a dispensing head having a set of nozzles to form layers on a receiving medium. Each of the dispensed layers may then be cured or solidified independently using a suitable methodology, to form solidified or partially solidified layers of the building material.

The building material formulation(s) may be initially liquid and subsequently harden (cured or solidified) to form the required layer shape. The hardening may be effected, for example, by exposing the building material to a curing condition, for example, to a curing energy such as thermal energy (e.g., by heating the building material) or to irradiation (e.g., UV or other photo-irradiation), or to chemical activation, for example, by exposure to a chemical reagent that promotes curing (e.g., an acid or base activation).

The formulations utilized in 3D inkjet printing processes are therefore selected so as to meet the process requirements, namely, exhibiting a suitable viscosity during jetting (thus being non-curable under jetting conditions) and rapid curing or solidification (e.g., within milliseconds or seconds), typically upon exposure to a stimulus (a curing condition) on the receiving medium. The building materials may include modeling materials and support materials, which form the object and optionally the temporary support constructions supporting the object as it is being built, respectively. The modeling material (which may include one or more material(s)) makes up the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably formed from respective formulations which are liquid at the working temperature at which they are dispensed, and which subsequently harden, typically upon exposure to a condition that affects curing of the materials, to form the required layer shape. After printing completion, support structures, if present, are removed to reveal the final shape of the fabricated 3D object.

In order to be compatible with most of the commercially-available print heads utilized in a 3D inkjet printing system, the uncured building material should feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds.

The hardened modeling material which forms the final object should preferably exhibit heat deflection temperature (HDT) which is higher than room temperature, in order to assure its usability. Desirably, the hardened modeling material should exhibit HDT of at least 35° C. For an object to be stable at variable conditions, a higher HDT is desirable. In most cases, it is also desirable that the object exhibits relatively high Izod Notched impact, e.g., higher than 50 or higher than 60 J/m.

Various three-dimensional inkjet printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

Several additive manufacturing (AM) processes, including three-dimensional inkjet printing, allow additive formation of objects using more than one modeling material, also referred to as "multi-material" AM processes. For example, U.S. Patent Application having Publication No. 2010/0191360, of the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all print heads operate during a single building scan cycle of the fabrication apparatus. In another mode, one or more of the print heads is not operative during a single building scan cycle or part thereof.

In a 3D inkjet printing process such as Polyjet™ (Stratasys® Ltd., Israel), the building material is selectively jetted from one or more inkjet print heads and deposited onto a fabrication tray in consecutive layers according to a pre-determined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions.

The Polyjet™ technology allows control over the position and composition of each voxel (volume pixel), which affords enormous design versatility and digital programming of multi-material structures. Other advantages of the Polyjet™ technology is the very high printing resolution, up to 14 μm layer height, and the ability to print multiple materials simultaneously, in a single object. This multi-material 3D printing process often serves for fabrication of complex parts and structures that are comprised of elements having different stiffness, performance, color or transparency. New ranges of materials, programmed at the voxel level, can be created by the PolyJet™ printing process, using only few starting materials.

International Patent Application Publication No. WO 2013/128452, by the present Assignee, discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Until today, most 3D inkjet methodologies have utilized photopolymerizable materials, and photo-induced curing, typically UV curing, thus narrowing the choice of materials and chemical reactions that can be utilized in this technology. Exemplary photopolymerizable building materials that are currently used in, for example, a "PolyJet™" technology (Stratasys® Ltd., Israel), are acrylic-based materials.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus families), and including also objects made using Digital ABS, which contain a multi-material made of two starting materials (e.g., RGD515™ & RGD535/531™), and simulate properties of engineering plastic. Most of the currently practiced PolyJet™ materials are curable materials which harden or solidify upon exposure to radiation, mostly UV radiation and/or heat, with the most practiced materials being acrylic-based materials.

Acrylic-based materials typically feature non-optimal thermal stability (resistance to thermal deformation). For example, acrylic-based materials such as multi-functional acrylic materials, which feature, when hardened, Tg above 200° C., exhibit high volume shrinkage which often results in curling and/or deformation of the printed object.

Curable materials which feature low volume shrinkage when hardened include, for example, epoxides, polyurethanes, polyamides, benzoxazine and cyanate esters (CE). However, most of these materials are not compatible with the PolyJet™ methodology due to technological restrictions such as high viscosity of the modeling formulation containing same at the inkjet printing heads' working temperature, instability, and toxicity.

Cyanate esters are known to provide polymeric materials featuring high thermal stability and good mechanical properties, are available at various grades, while some cyanate esters also meet the system requirements of PolyJet™. However, cyanate esters are curable only upon application of heat at elevated temperatures (e.g., higher than 180° C.) and are further characterized by slow curing kinetics (minutes scale versus milliseconds scale that typically characterize PolyJet™ materials), and hence their use in PolyJet™ is restricted.

U.S. Pat. Nos. 9,780,440 and 9,873,761 describe a thermosetting resin composition usable in additive manufacturing, formed by a two-stage curing of a curable component that can be photo-curable, peroxide-curable, EB-curable and/or cationic curable and another curable component that is thermally curable, and can include a cyanate ester.

WO 2017/040883 also describes dual cure resin compositions which are cured by exposure to light and then by exposure to heat or microwave irradiation, and their use in additive manufacturing.

Additional background art includes WO2009/013751; WO 2016/063282; WO 2016/125170; WO 2017/134672; WO2017/134673; WO 2017/134674; WO 2017/134676; WO 2017/068590; WO2017/187434; WO2018/055521; and WO2018/055522, all to the present assignee.

SUMMARY OF THE INVENTION

In a search for performing 3D-inkjet printing using modeling material formulations that provide hardened materials that exhibit high thermal stability, while meeting the requirements of the 3D-inkjet printing system and methodology, the present inventors have designed and successfully practiced a formulation system composed of a cyanate ester curable material and an activating agent that promotes its polymerization when exposed to thermal curing, which exhibits a desired viscosity, surface tension and other requirements of a 3D-inkjet printing system, and good printability, while providing objects featuring high thermal stability and other improved mechanical properties. The newly designed formulation system is relatively stable (remains uncured) when jetted, undergoes a partial curing upon being dispensed, and an additional post-printing curing of the obtained green body.

According to an aspect of some embodiments of the present invention there is provided a method of fabricating a three-dimensional object by three-dimensional inkjet printing, the object comprising, in at least a portion thereof, a cyanate ester-containing polymeric network, the method comprising sequentially forming a plurality of layers in a configured pattern corresponding to the shape of the object, thereby fabricating the object, wherein a formation of at least a portion of the layers comprises dispensing a first modeling material formulation which comprises a first curable material being a thermally-curable cyanate ester and a second modeling material formulation which comprises an activating agent for promoting polymerization of the cyanate ester and is devoid of the first curable material, the at least two modeling material formulations further comprise a second curable material being different from the first curable material, and optionally an agent for promoting hardening of the second curable material, thereby fabricating the three-dimensional object.

According to some of any of the embodiments described herein, a viscosity of each of the first and second modeling material formulations does not exceed 50 cps, or 40 cps, or 30 cps, at 68° C.

According to some of any of the embodiments described herein, the method further comprises exposing each of the layers to a first curing condition for effecting hardening of the second curable material.

According to some of any of the embodiments described herein, the first curing condition does not comprise application of heat energy.

According to some of any of the embodiments described herein, the first curable material and the first curing condition are such that a degree of polymerization of the cyanate ester is no more than 20%.

According to some of any of the embodiments described herein, the method further comprises exposing the layers to a second curing condition to thereby effect polymerization of the thermally-curable cyanate ester, the second curing condition comprising heat energy.

According to some of any of the embodiments described herein, a formation of the at least a portion of the layers comprises:

repeating the dispensing of the at least two modeling material formulations, and the exposing of each of the layers to the first curing condition; and collectively exposing the plurality of layers to the second curing condition.

According to some of any of the embodiments described herein, the second curing condition comprises heating the layers at a temperature of at least 80° C., for a time period of at least 1 hour.

According to some of any of the embodiments described herein, the first formulation comprises the first curable material and the agent for promoting polymerization of the second curable material.

According to some of any of the embodiments described herein, the second formulation comprises the second curable material and the agent for promoting polymerization of the cyanate ester.

According to some of any of the embodiments described herein, the second curable material is a photocurable material, preferably a UV-curable material.

According to some of any of the embodiments described herein, the first curing condition comprises irradiation, preferably UV irradiation.

According to some of any of the embodiments described herein, the agent for promoting hardening of the second curable material is a photoinitiator.

According to some of any of the embodiments described herein, the photocurable material features, when hardened, Tg of at least 150° C.

According to some of any of the embodiments described herein, the second curable material is an acrylic material.

According to some of any of the embodiments described herein, the acrylic material comprises a di-functional and/or a multi-functional acrylic material.

According to some of any of the embodiments described herein, the second curable material features, when hardened, Tg higher than 100° C. or higher than 150° C.

According to some of any of the embodiments described herein, the agent for promoting polymerization of the cyanate ester is activatable upon the exposing to the first curing condition and/or to the second curing condition.

According to some of any of the embodiments described herein, the agent for promoting polymerization of the cyanate ester is inactive or is partially active towards promoting polymerization of the cyanate ester prior to the exposing to the first curing condition and/or to the second curing condition.

According to some of any of the embodiments described herein, the at least two formulations further comprise an agent that activates the agent for promoting polymerization of the cyanate ester.

According to some of any of the embodiments described herein, the agent activates the agent for promoting polymerization of the cyanate ester upon exposure to the first curing condition and/or to the second curing condition.

According to some of any of the embodiments described herein, the agent for promoting polymerization of the cyanate ester comprises a nucleophilic group.

According to some of any of the embodiments described herein, the nucleophilic group is thiol.

According to some of any of the embodiments described herein, the nucleophilic group is amine.

According to some of any of the embodiments described herein, the amine is selected from a primary amine, a secondary amine and a combination thereof.

According to some of any of the embodiments described herein, the agent for promoting polymerization of the cyanate ester is an aromatic amine.

According to some of any of the embodiments described herein, the agent for promoting polymerization of the cyanate ester is an aromatic secondary amine.

According to some of any of the embodiments described herein, the second formulation further comprises a metal species that promotes polymerization of the cyanate ester.

According to some of any of the embodiments described herein, the at least two modeling material formulation further comprise an additional curable material which is capable of interacting with the cyanate ester to thereby form a co-polymeric network.

According to some of any of the embodiments described herein, the additional curable material is capable of interacting with the cyanate ester upon exposure to the first and/or the second curing condition.

According to some of any of the embodiments described herein, the additional curable material is or comprises an epoxy-containing curable material.

According to some of any of the embodiments described herein, the additional curable material features a viscosity lower than 1,000, or lower than 500, centipoises, at room temperature. According to some of any of the embodiments described herein, a weight ratio of the first and the second modeling material formulations in each of the layers ranges from 50:50 to 70:30.

According to some of any of the embodiments described herein, dispensing the first and second formulations is in a voxelated manner, and wherein voxels of the first modeling formulation are interlaced with voxels and the second modeling formulation.

According to some of any of the embodiments described herein, a weight ratio of the voxels of the first modeling formulation and the voxels of the second modeling formulation ranges from 50:50 to 70:30.

According to some of any of the embodiments described herein, the first formulation comprises the first curable material and a photoinitiator and the second formulation comprises a multi-functional acrylic material that features, when hardened, a Tg of at least 150° C., and an aromatic amine.

According to some of any of the embodiments described herein, a total amount of the multi-functional acrylic material ranges from 20 to 40, or from 20 to 30, or from 25 to 30, % by weight, of the total weight of the first and second formulations.

According to some of any of the embodiments described herein, an amount of the aromatic amine ranges from 2 to 4, % by weight of the total weight of the first and second formulations.

According to some of any of the embodiments described herein, an amount of the photoinitiator ranges from 0.5 to 1.5%, by weight, of the total weight of the first and second formulations.

According to some of any of the embodiments described herein, the aromatic amine is an aromatic secondary amine.

According to some of any of the embodiments described herein, the at least two formulations further comprise an additional curable material that is capable of interacting with the cyanate ester.

According to some of any of the embodiments described herein, the first formulation is devoid of the additional curable material.

According to some of any of the embodiments described herein, the additional curable material is included in the second modeling material formulation.

According to some of any of the embodiments described herein, a total amount of the first curable material and the additional curable material, if present, ranges from 50 to 80, or from 60 to 80, or from 60 to 70, %, by weight, of the total weight of the at least two formulations.

According to some of any of the embodiments described herein, forming the plurality of layers further comprises dispensing a third modeling material, the dispensing being configured such that the at least two formulations form an inner region and the third formulation forms an outer region enveloping at least a portion of the inner region.

According to some of any of the embodiments described herein, the third modeling material formulation comprises a third curable material which is curable upon exposure to the first curing condition.

According to some of any of the embodiments described herein, forming the plurality of layers further comprises dispensing a support material formulation.

According to some of any of the embodiments described herein, the method further comprises removing a (hardened, solidified) support material formed of the support material formulation.

According to an aspect of some embodiments of the present invention there is provided a three-dimensional object obtainable by the method as described herein in any of the respective embodiments and any combination thereof.

According to an aspect of some embodiments of the present invention there is provided a formulation system usable in additive manufacturing of a three-dimensional object that comprises, in at least a portion thereof, a cyanate ester-containing polymeric network or material, the formulation system comprising a first modeling material formulation which comprises a first curable material being a thermally-curable cyanate ester, as described herein in any of the respective embodiments and a second modeling material formulation which comprises an activating agent for promoting polymerization of the cyanate ester, as described herein in any of the respective embodiments, and is devoid of the first curable material, the formulation system further comprises a second curable material being different from the first curable material, and optionally an agent for promoting hardening of the second curable material, as these are described herein in any of the respective embodiments and any combination thereof.

According to an aspect of some embodiments of the present invention there is provided a kit comprising the formulation system as described herein in any of the respective embodiments, wherein the first and the second modeling material formulations are separately packaged within the kit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 5A:
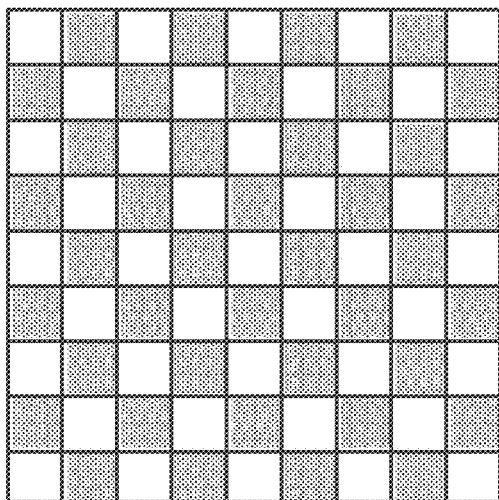
Figure 5B:
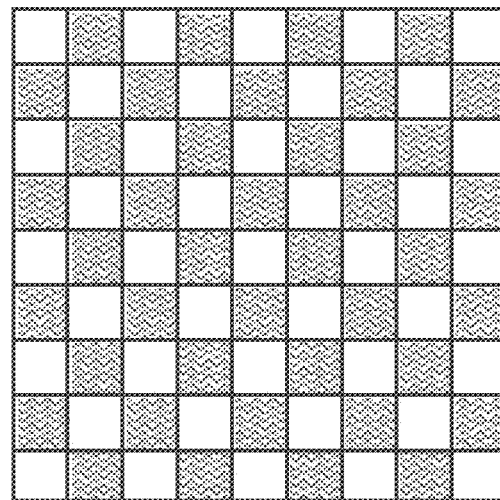

FIGS. 5A and 5B present schematic illustrations of bitmaps in embodiments of the invention in which a "Drop on Drop" printing protocol is employed. A bitmap suitable for the deposition of the first composition is illustrated in FIG. 5A and a bitmap suitable for the deposition of the second composition is illustrated in FIG. 5B. When the droplets of both compositions have the same or approximately the same weight, the bitmaps are useful for a 50:50 (or 1:1) w/w ratio. White boxes represent vacant locations, dotted boxes represent droplets of the first composition and wavy boxes represent droplets of the second composition. Each patterned (wavy/dotted) box represents a pixel (e.g., one composition droplet) in a layer. Both compositions can be deposited at the same location, but at different times, during movement of the printing head.

Figure 6A:
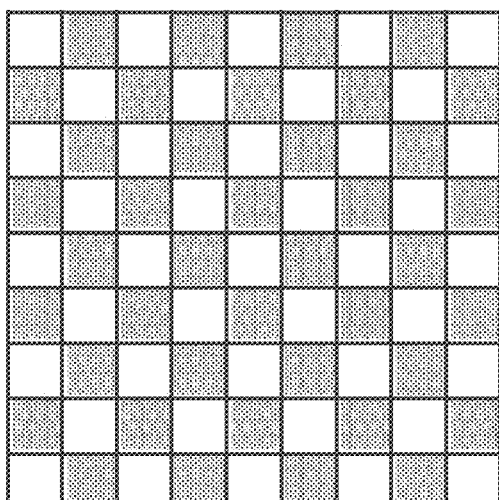
Figure 6B:
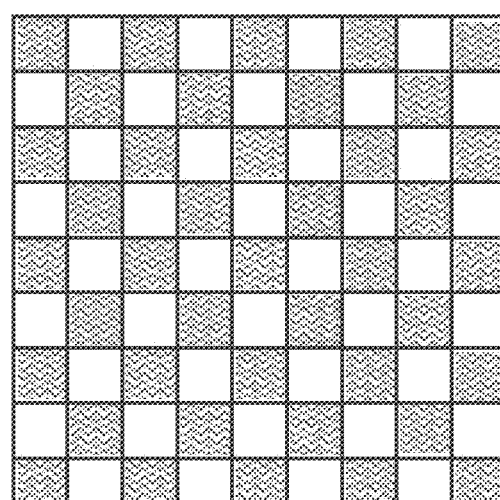

FIGS. 6A and 6B present schematic illustrations of bitmaps in embodiments of the invention in which a "side-by-side" printing protocol is employed. A bitmap suitable for the deposition of the first composition is illustrated in FIG. 6A and a bitmap suitable for the deposition of the second composition is illustrated in FIG. 6B. When the droplets of both compositions have the same or approximately the same weight, the bitmaps are useful for a 50:50 (or 1:1) w/w ratio. White boxes represent vacant locations, dotted boxes represent droplets of the first composition and wavy boxes represent droplets of the second composition. Each patterned (wavy/dotted box represents a pixel (e.g., one formulation droplet). A drop of the first composition (dotted boxes) is deposited adjacent to a drop of the second composition.

Figure 7:
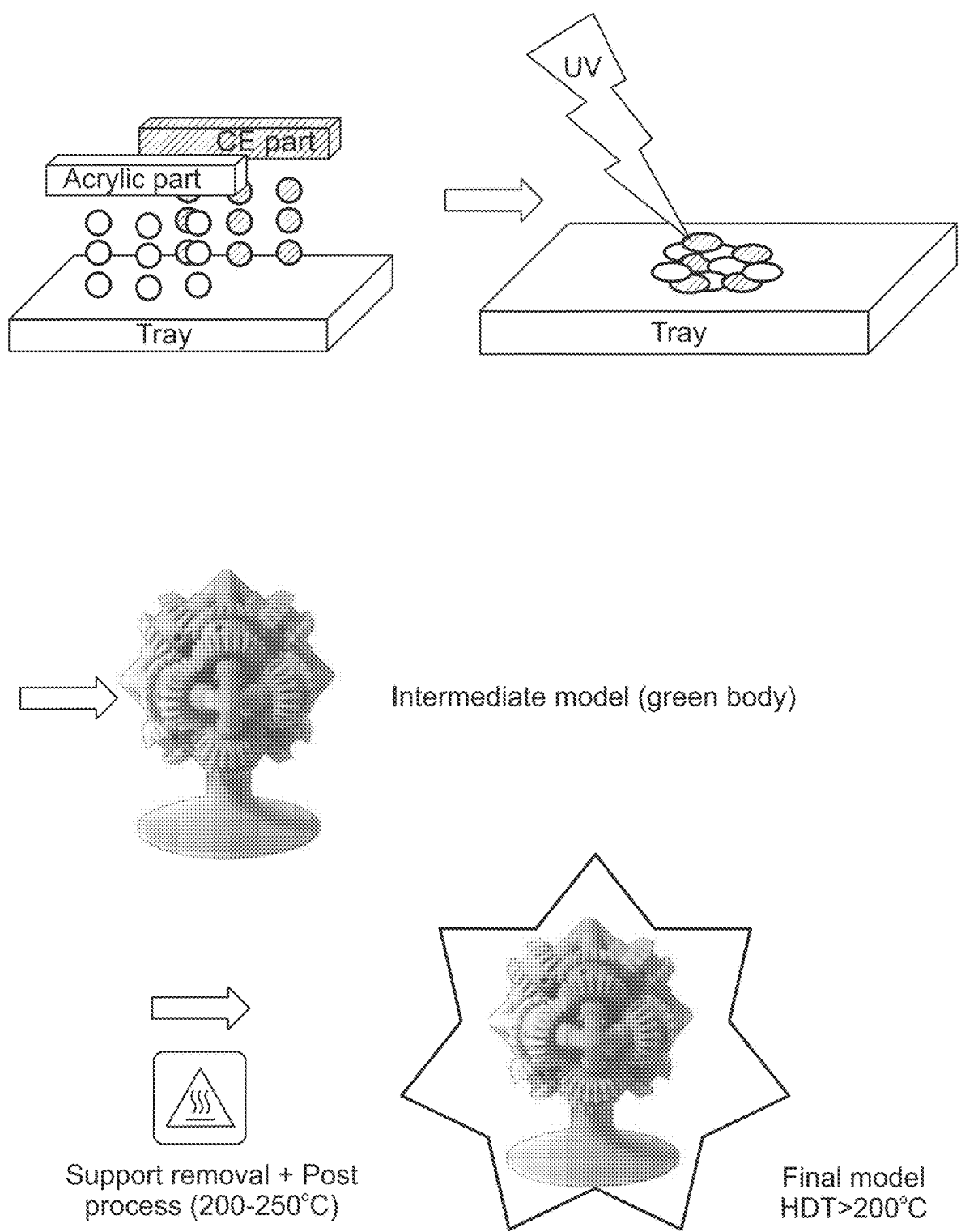

FIG. 7 presents a schematic illustration of an exemplary method according to some embodiments of the present invention.

Figure 8:
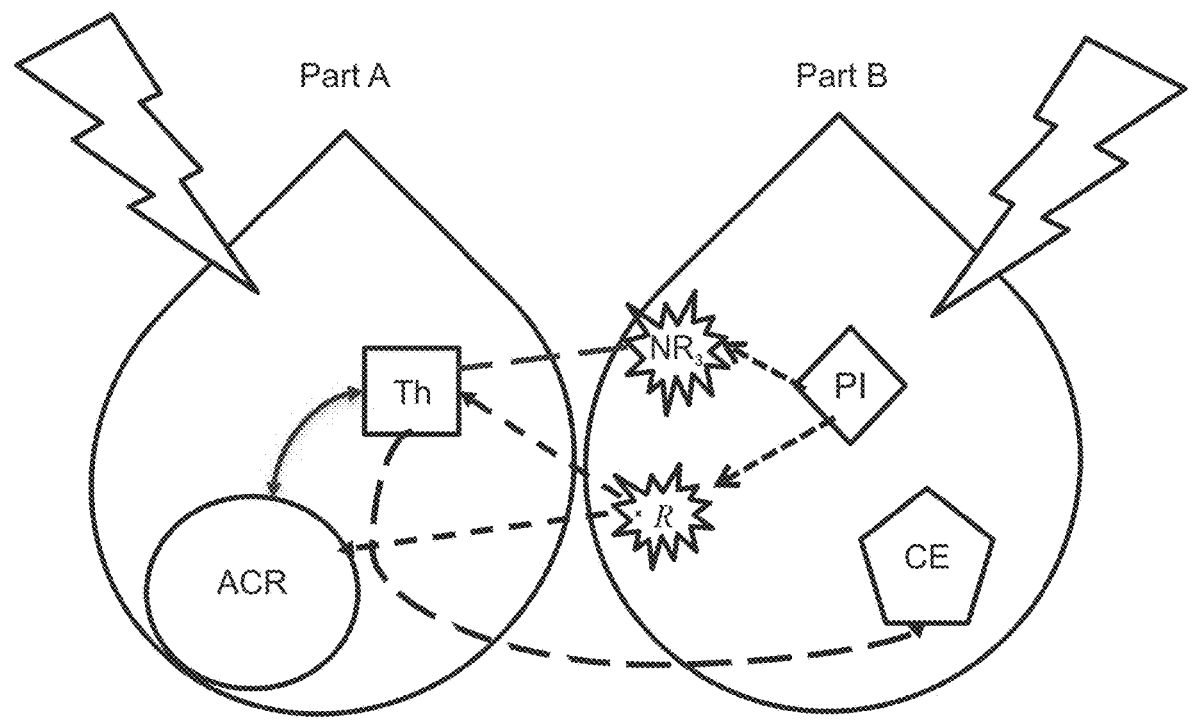

FIG. 8 presents a schematic illustration of an exemplary formulation system according to some embodiments of the present invention and of the interaction of its components upon exposure to radiation.

Figure 9:
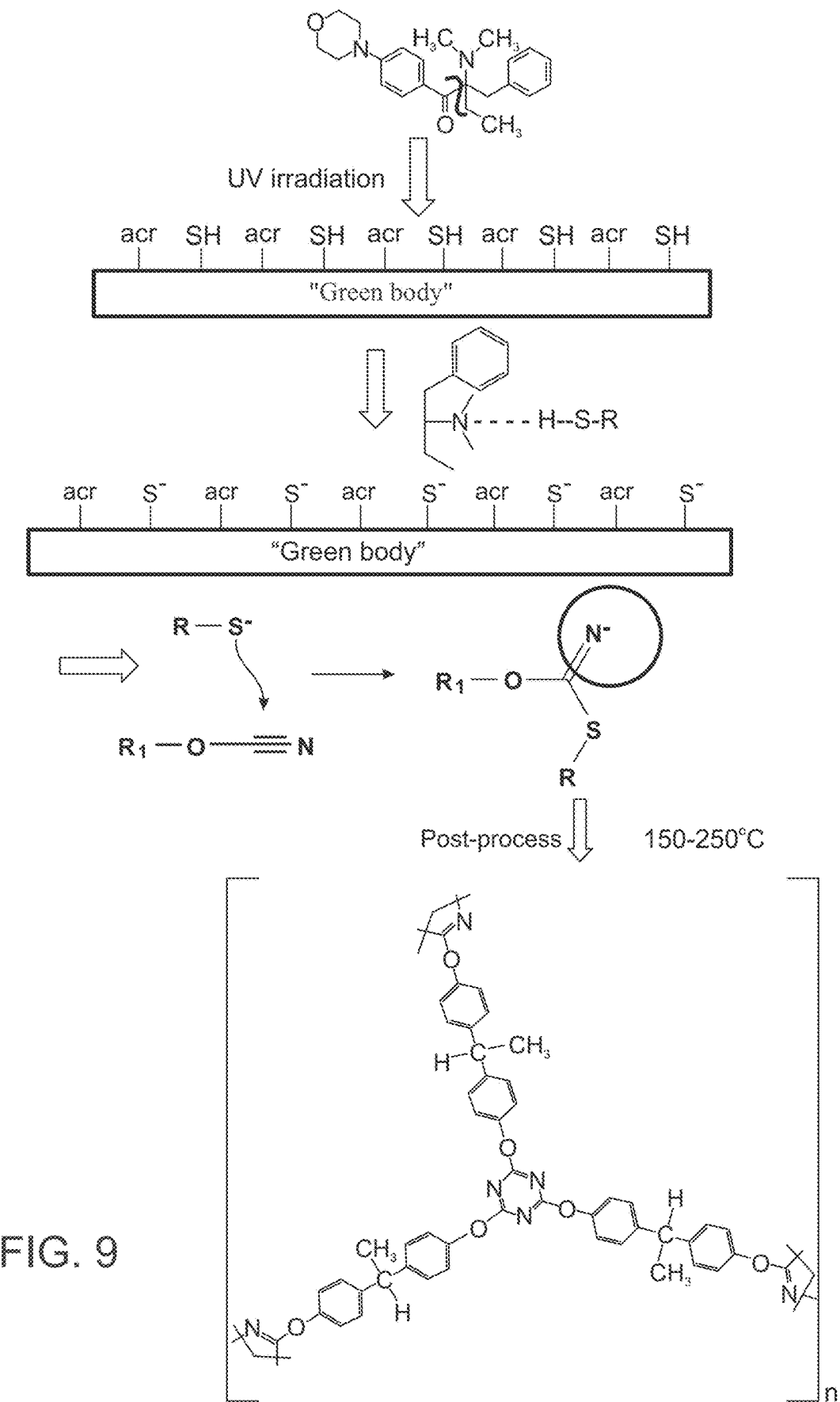

FIG. 9 presents exemplary chemical reactions that are effected upon dispensing a formulation system according to exemplary embodiments of the present invention, exposing each of the dispensed layers to irradiation to form a green body and exposing the green body to post curing.

Figure 10:
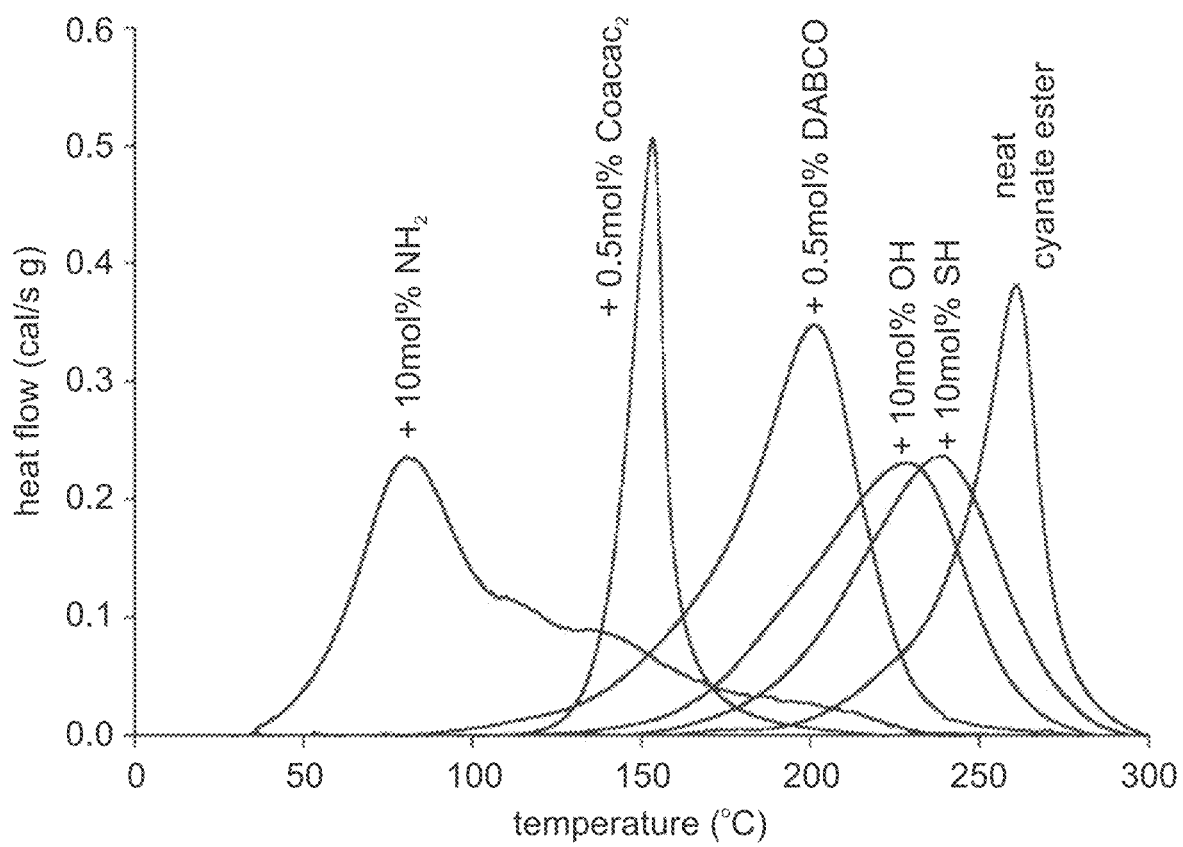

FIG. 10 (Background Art) is taken from Bauer and Bauer, Microsystem Technologies 8 (2002) 58-62, and presents DSC-thermograms of mixtures of a cyanate ester with different catalysts and comonomers.

Figure 11A:
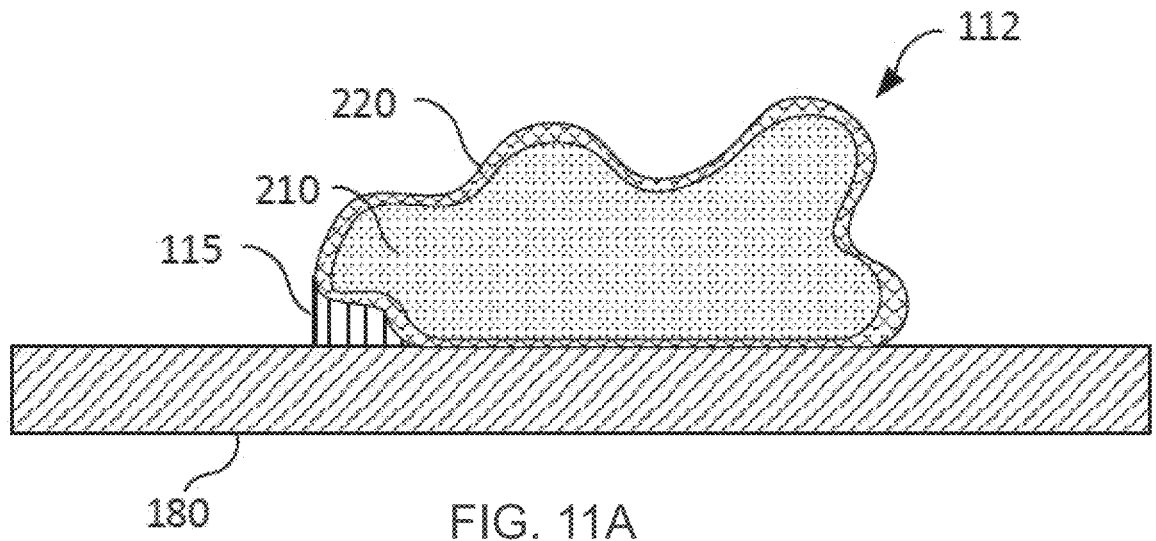
Figure 11B:
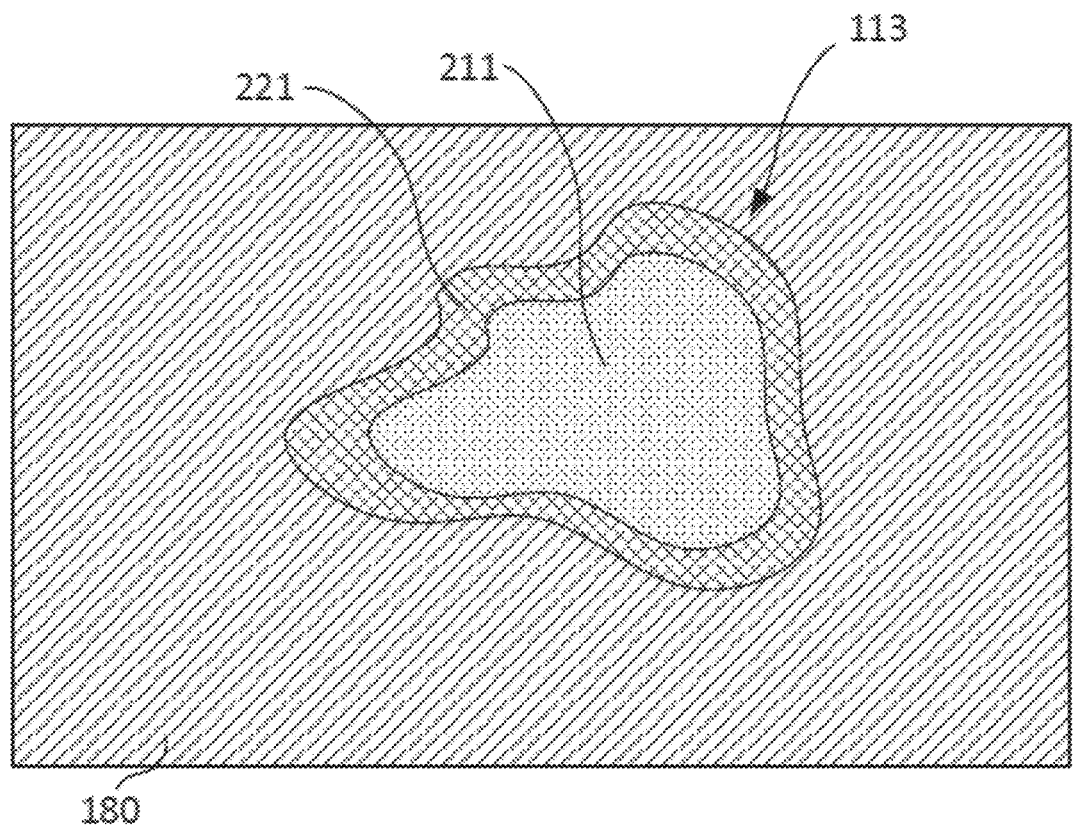

FIGS. 11A-11B are simplified schematic drawings of a cross sectional view (FIG. 11A) of an object fabricated with a core filled with a formulation system according to embodiments of the present invention enveloped by a shell formed with a third formulation according to some embodiments of the present invention and a top view (FIG. 11B) of single layer of the object respectively, both in accordance with some exemplary embodiments of the present invention.

Figure 12:
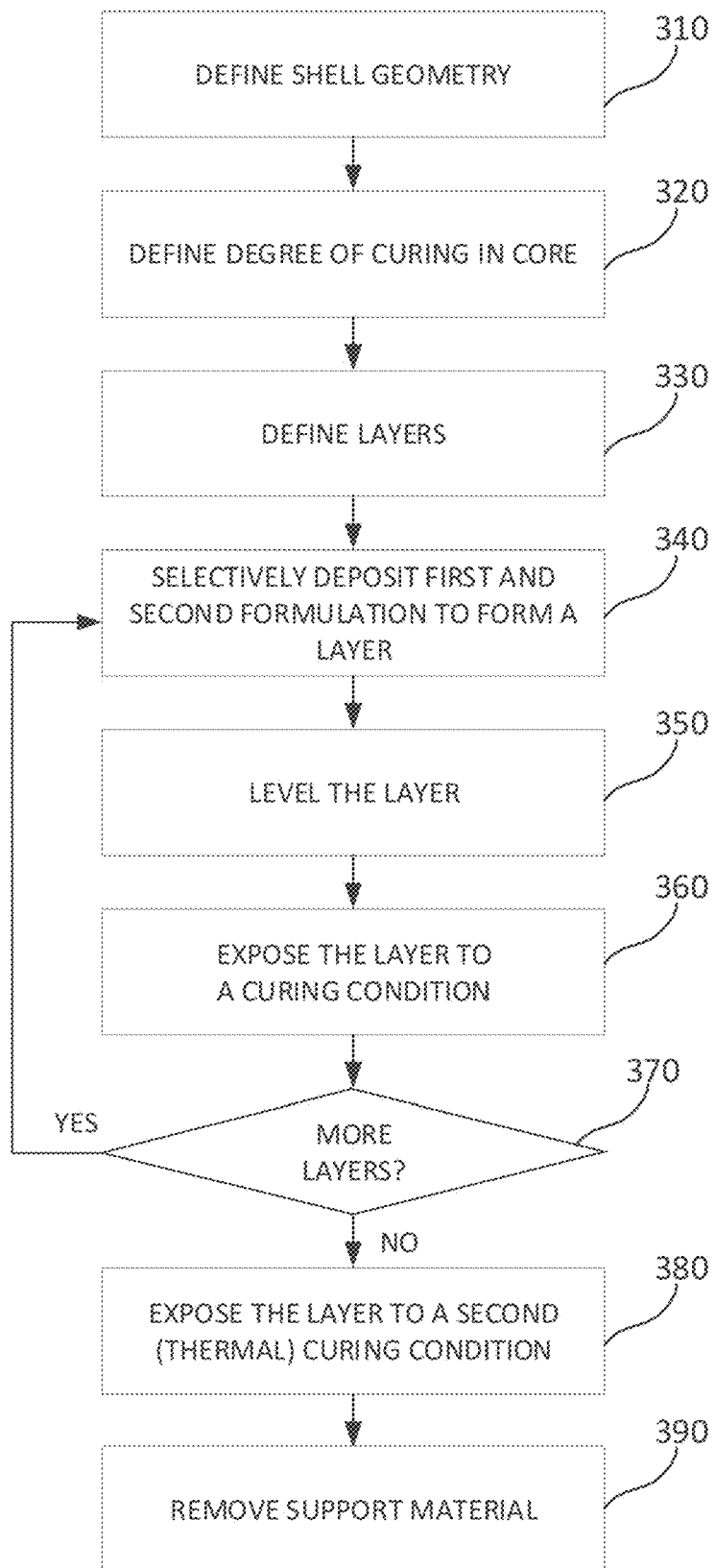

FIG. 12 is a simplified flow chart of an exemplary method of 3D inkjet printing of an object according to some embodiments of the present invention, in which a core made of a formulation system according to the present embodiments is enveloped by a shell made of a third formulation according to some embodiments of the present invention.

Figure 13:
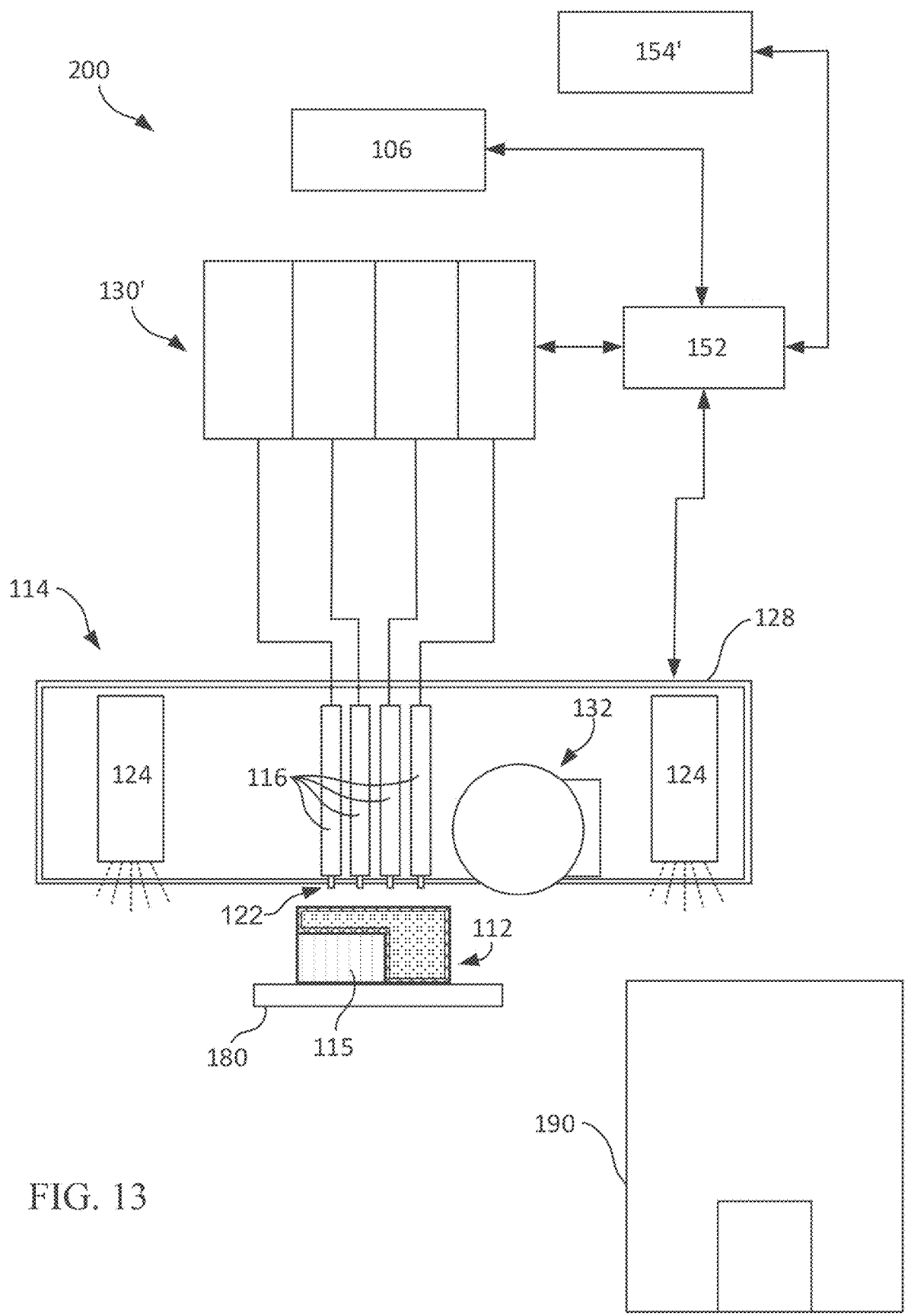

FIG. 13 is a simplified block diagram of an exemplary ink-jet printing system for executing a method as shown in FIG. 12.

Figure 14:

FIG. 14 shows exemplary curling bars printed according to some embodiments of the present invention.

Figure 15:

FIG. 15 shows exemplary objects printed according to some embodiments of the present invention.

Figure 16:
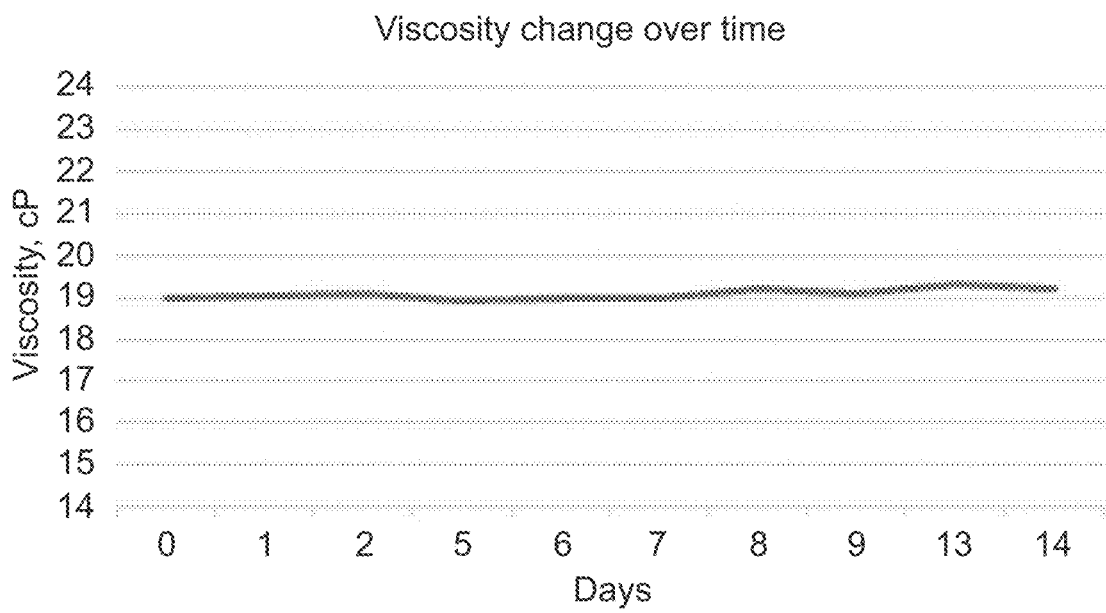

FIG. 16 is a graph showing no change in a viscosity of an exemplary second formulation according to some of the present embodiments when maintained at 65° C.

Figure 17:
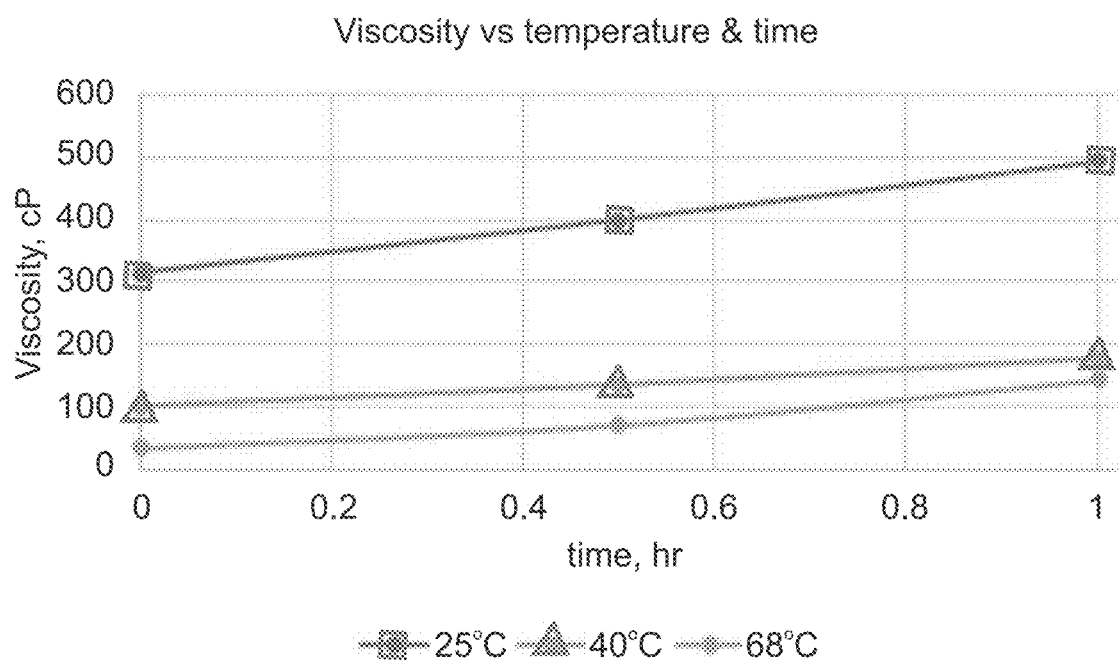

FIG. 17 presents comparative plots showing a change is a viscosity of a formulation system according to some embodiments of the present invention over time, when maintained at various temperatures.

DESCRIPTION OF SPECIFIC EMBODIMENTS OF THE INVENTION

The present invention, in some embodiments thereof, relates to three-dimensional printing and, more particularly, but not exclusively, to methods of three-dimensional inkjet printing employing a thermally-curable cyanate ester, and to objects obtained by these methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As described hereinabove, cyanate esters are known to provide polymeric materials featuring high thermal stability and good mechanical properties, and are available at various grades. However, using formulations containing cyanate esters in 3D inkjet printing such as Polyjet™ is restricted since such formulations are typically characterized by instability and/or high viscosity at the inkjet printing heads' working temperature, are curable only upon application of heat at elevated temperatures (e.g., higher than 180° C.) and are further characterized by slow curing kinetics (minutes scale versus milliseconds scale that typically characterize PolyJet™ materials).

In a search for modeling material formulations that provide polymeric materials featuring high thermal stability and good mechanical properties, the present inventors have designed and successfully practiced formulation systems that allow using cyanate esters as curable materials while meeting the requirements of 3D-inkjet printing.

Embodiments of the present invention therefore relate to novel formulation systems which are usable in additive manufacturing such as 3D inkjet printing, to kits comprising these formulations, to additive manufacturing utilizing these formulations and to 3D objects obtained thereby.

Herein throughout, the term "object" describes a final product of the additive manufacturing. This term refers to the product obtained by a method as described herein, after removal of the support material, if such has been used as part of the building material, and after all the modeling materials are hardened. The "object" therefore essentially consists (e.g., at least 90 or at least 95 weight percents) of a hardened (e.g., cured) modeling material.

The term "object" as used herein throughout refers to a whole object or a part thereof.

An object according to the present embodiments is such that at least a part or a portion thereof comprises a polycyanurate (a polymerized (cyclotrimerized) cyanate ester). The object may be such that several parts or portions thereof are made of a polycyanurate material, optionally and preferably in combination with another polymerized or cured material.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

The phrases "cured modeling material", "hardened modeling material", "solidified modeling material" or "cured/hardened/solidified modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "modeling material" "model material" or simply as "formulation", describes a part or all of the uncured building material which is dispensed so as to form the object, as described herein. The modeling material formulation is an uncured modeling formulation (unless specifically indicated otherwise), which, upon exposure to a condition that effects curing, may form the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling material formulations, and can be dispensed such that different parts of the object are made, upon being hardened, of different cured modeling formulations, and hence are made of different hardened (e.g., cured) modeling materials or different mixtures of hardened (e.g., cured) modeling materials.

The final three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention, an object is manufactured by dispensing a building material that comprises two or more different modeling material formulations, each modeling material formulation from a different dispensing head and/or nozzle of the inkjet printing apparatus. The modeling material formulations are optionally and preferably deposited in layers during the same pass of the printing heads. The modeling material formulations and/or combination of formulations within the layer are selected according to the desired properties of the object and according to the method parameters described herein.

According to some of any of the embodiments described herein, a modeling material formulation comprises one or more curable materials.

Herein throughout, a "curable material" or a "solidifiable material" is a compound (e.g., monomeric or oligomeric or polymeric compound) which, when exposed to a curing condition (e.g., curing energy), as described herein, solidifies or hardens to form a cured modeling material as defined herein. Curable materials are typically polymerizable materials, which undergo polymerization and/or cross-linking when exposed to a suitable energy source. A curable or solidifiable material is typically such that its viscosity increases by at least one order of magnitude when it is exposed to a curing condition.

In some of any of the embodiments described herein, a curable material can be a monomer, an oligomer or a short-chain polymer, each being polymerizable as described herein.

In some of any of the embodiments described herein, when a curable material is exposed to curing energy (e.g., radiation), it polymerizes by any one, or combination, of chain elongation and cross-linking. In the case of a cyanate ester, polymerization is effected upon exposure to heat energy and comprises cyclotrimerization to form a polycyanurate, as shown, for example, in FIG. 8.

In some of any of the embodiments described herein, a curable material is a monomer or a mixture of monomers which can form a polymeric modeling material upon a polymerization reaction, when exposed to a curing condition at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to a curing condition at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to a curing condition (e.g., curing energy).

A multi-functional curable material comprises two or more, e.g., 2, 3, 4 or more, functional groups that can undergo polymerization when exposed to a curing condition. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric moiety, the multi-functional group is an oligomeric multi-functional curable material.

Exemplary curable materials that are commonly used in additive manufacturing and in some of the present embodiments are acrylic materials.

Herein throughout, the term acrylic materials collectively encompass materials bearing one or more acrylate, methacrylate, acrylamide and/or methacrylamide group(s).

The curable materials included in a modeling material formulation as described herein may be defined by the properties provided by each material, when hardened. That is, the materials may be defined by properties of a material formed upon exposure to a curing condition, for example, upon polymerization. These properties (e.g., Tg, HDT), are of a polymeric material formed upon curing any of the described curable materials alone.

As used herein, the term "curing" or "hardening" describes a process in which a formulation is hardened. This term encompasses polymerization of monomer(s) and/or oligomer(s) and/or cross-linking of polymeric chains (either of a polymer present before curing or of a polymeric material formed in a polymerization of the monomers or oligomers). The product of a curing reaction or of a hardening is therefore typically a polymeric material and in some cases a cross-linked polymeric material.

Partial curing or hardening as used herein encompasses a curing or hardening process that does not reach completion, that is, for example, a process that is effected up to a hardening degree, as defined hereinafter, which is less than 100%, or less than 90%, or less than 80%, or less. A material that is partially cured may stay in a liquid-jelly state. Complete curing or hardening as used herein is curing or hardening to a degree of at least 80%, or at least 90%, or of about 100%, for example, a curing or hardening process that results in a solidified material.

A "degree of hardening" as used herein represents the extent at which curing is effected, that is, the extent at which curable materials underwent polymerization and/or cross-linking. When a curable material is a polymerizable material, this phrase encompasses both a mol % of the curable materials in a formulation that underwent polymerization and/or cross-linking, upon exposure to a curing condition; and/or the degree at which polymerization and/or cross-linking was effected, for example, the degree of chain elongation and/or cross-linking. Determining a degree of hardening (e.g., degree of polymerization) can be performed by methods known to those skilled in the art.

A "green body object" as used herein is an object formed by an additive manufacturing (AM) process that has at least a portion that only been partially hardened or solidified and requires additional hardening to obtain a fully solidified object.

Herein, the phrase "a condition that affects curing" or "a condition for inducing curing", which is also referred to herein interchangeably as "curing condition" or "curing inducing condition" describes a condition which, when applied to a formulation that contains a curable material, induces polymerization of monomer(s) and/or oligomer(s) and/or cross-linking of polymeric chains. Such a condition can include, for example, application of a curing energy, as described hereinafter, to the curable material(s), and/or contacting the curable material(s) with chemically reactive components such as catalysts, co-catalysts, and activators.

When a condition that induces curing comprises application of a curing energy, the phrase "exposing to a curing condition" means that each of the dispensed layers are exposed to the curing energy and the exposure is typically performed by applying a curing energy to the dispensed layers.

A "curing energy" typically includes application of radiation or application of heat.

The radiation can be electromagnetic radiation (e.g., ultraviolet or visible light), or electron beam radiation, or ultrasound radiation or radiofrequency (RF) radiation, including radio waves and microwaves, depending on the materials to be cured.

The application of radiation (or irradiation) is effected by a suitable radiation source. For example, an ultraviolet or visible or infrared or Xenon lamp can be employed, as described herein.

A curable material or system that undergoes curing upon exposure to radiation is referred to herein interchangeably as "photopolymerizable" or "photoactivatable" or "photocurable".

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some embodiments, a curable material as described herein includes a polymerizable material that polymerizes via photo-induced radical polymerization.

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is affected by irradiating the dispensed layers by heat-inducing radiation. Such irradiation can be effected, for example, by means of an IR lamp or Xenon lamp, operated to emit radiation onto the deposited layer.

A curable material or system that undergoes curing upon exposure to heat is referred to herein as "thermally-curable" or "thermally-activatable" or "thermally-polymerizable".

In some embodiments, a curable material as described herein includes a polymerizable material that polymerizes via thermally-induced radical polymerization.

Some curable materials are curable when exposed to radiation and/or heat and therefore can harden via thermal and/or photo-induced curing.

According to an aspect of some embodiments of the present invention there is provided a method of additive manufacturing of a three-dimensional object, preferably by 3D inkjet printing, which comprises, in at least a portion thereof (as described in further detail hereinafter) a polycyanurate material, as defined herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s), and exposing the dispensed modeling material to a curing condition (e.g., curing energy) to thereby form a cured modeling material, as described herein.

Figure 1A:
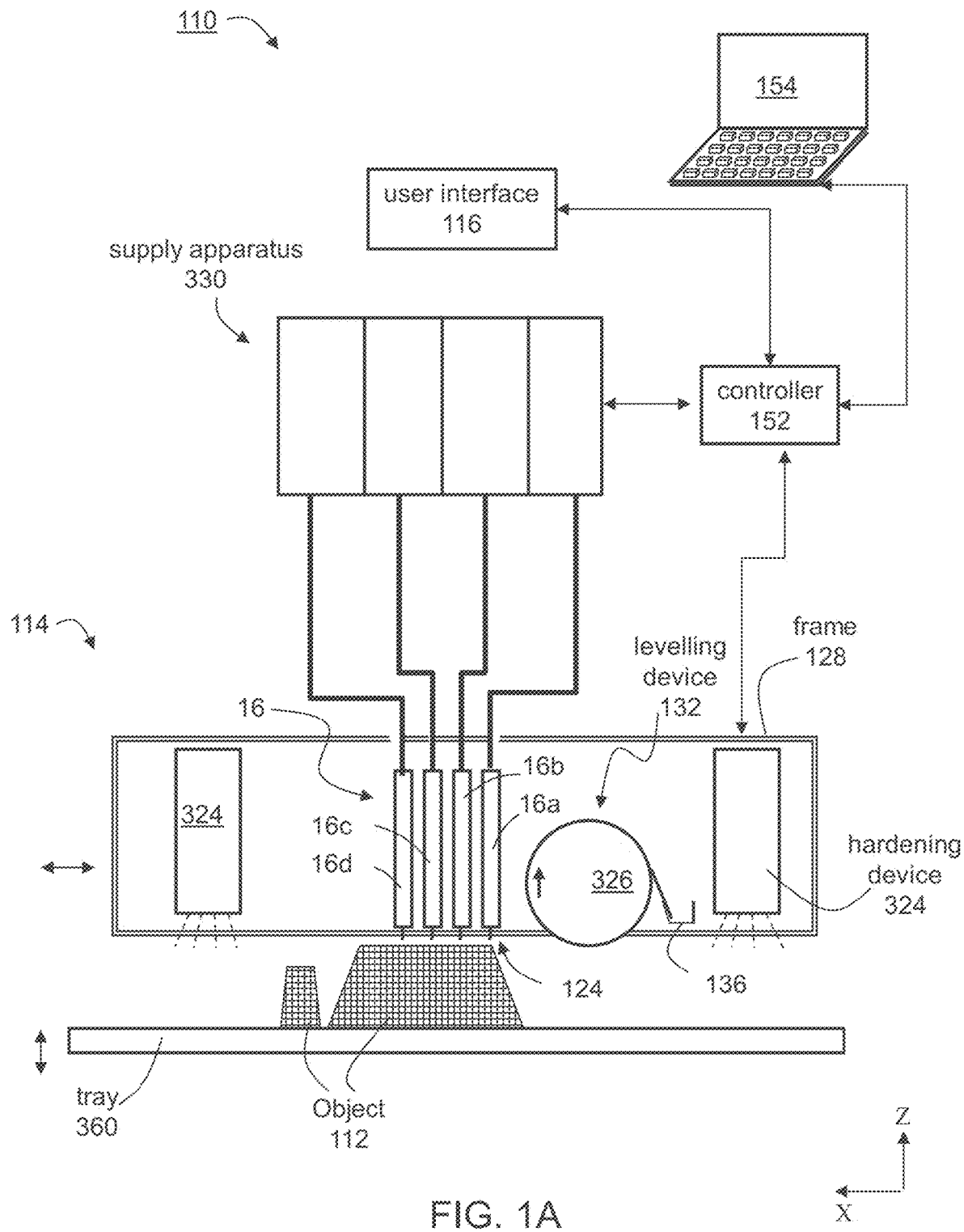
FIGS. 1A-1D are schematic illustrations of an additive manufacturing system according to some embodiments of the invention.
Figure 2A:
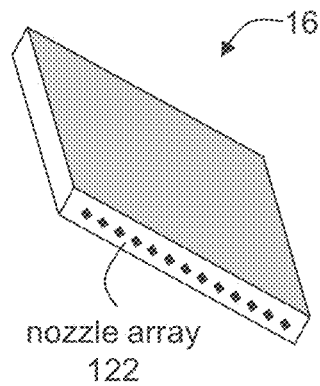
FIGS. 2A-2C are schematic illustrations of printing heads according to some embodiments of the present invention.
Figure 2B:
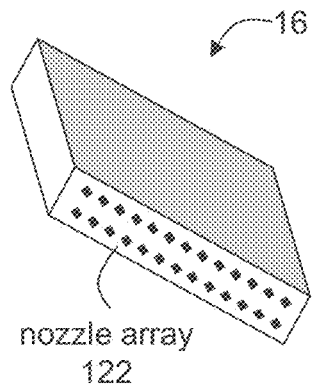
Figure 2C:
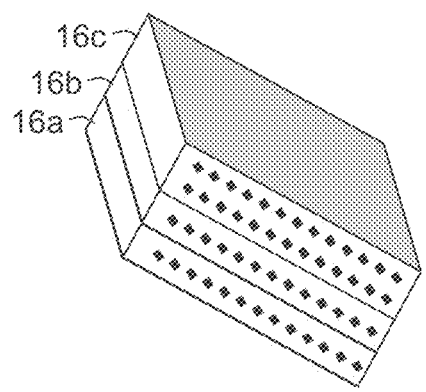

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-2C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. To dispense the building material formulation, a voltage signal is applied to the dispensing heads to selectively deposit droplets of a material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In some embodiments of the present invention apparatus 114 comprises cooling system 134 such as one or more fans or the like.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material formulation in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
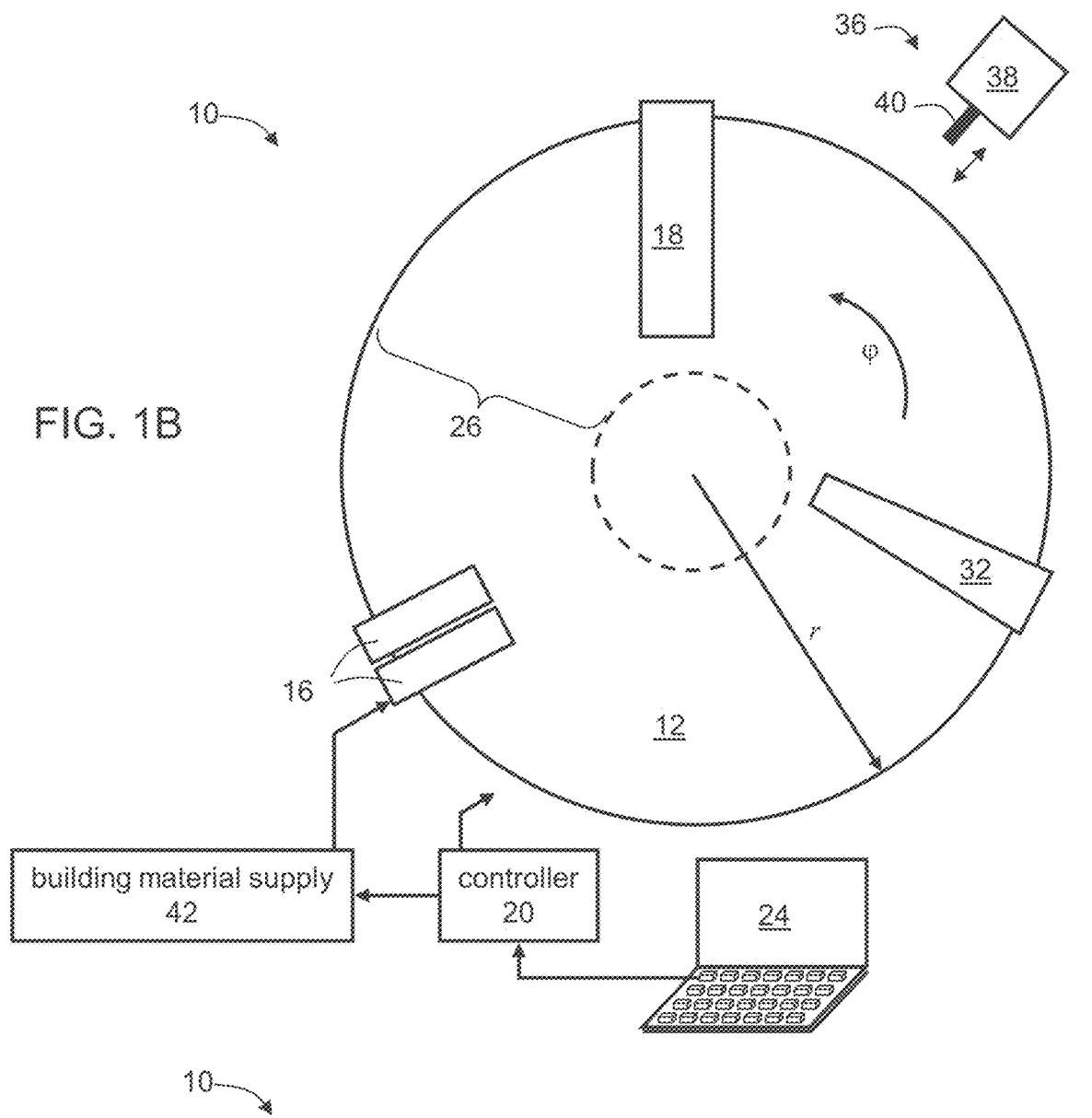
Figure 1C:
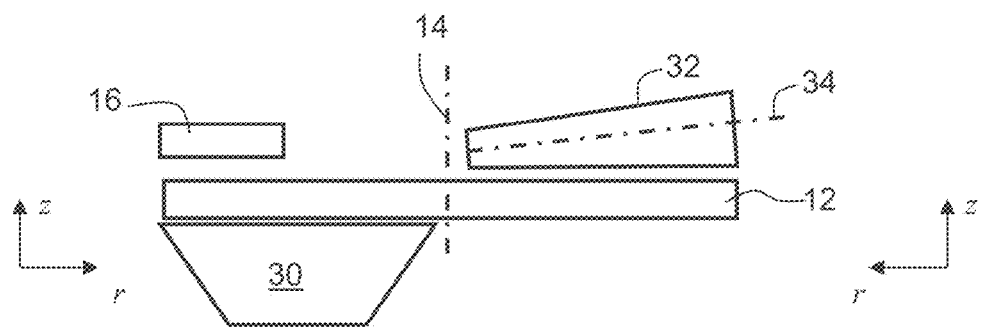
Figure 1D:
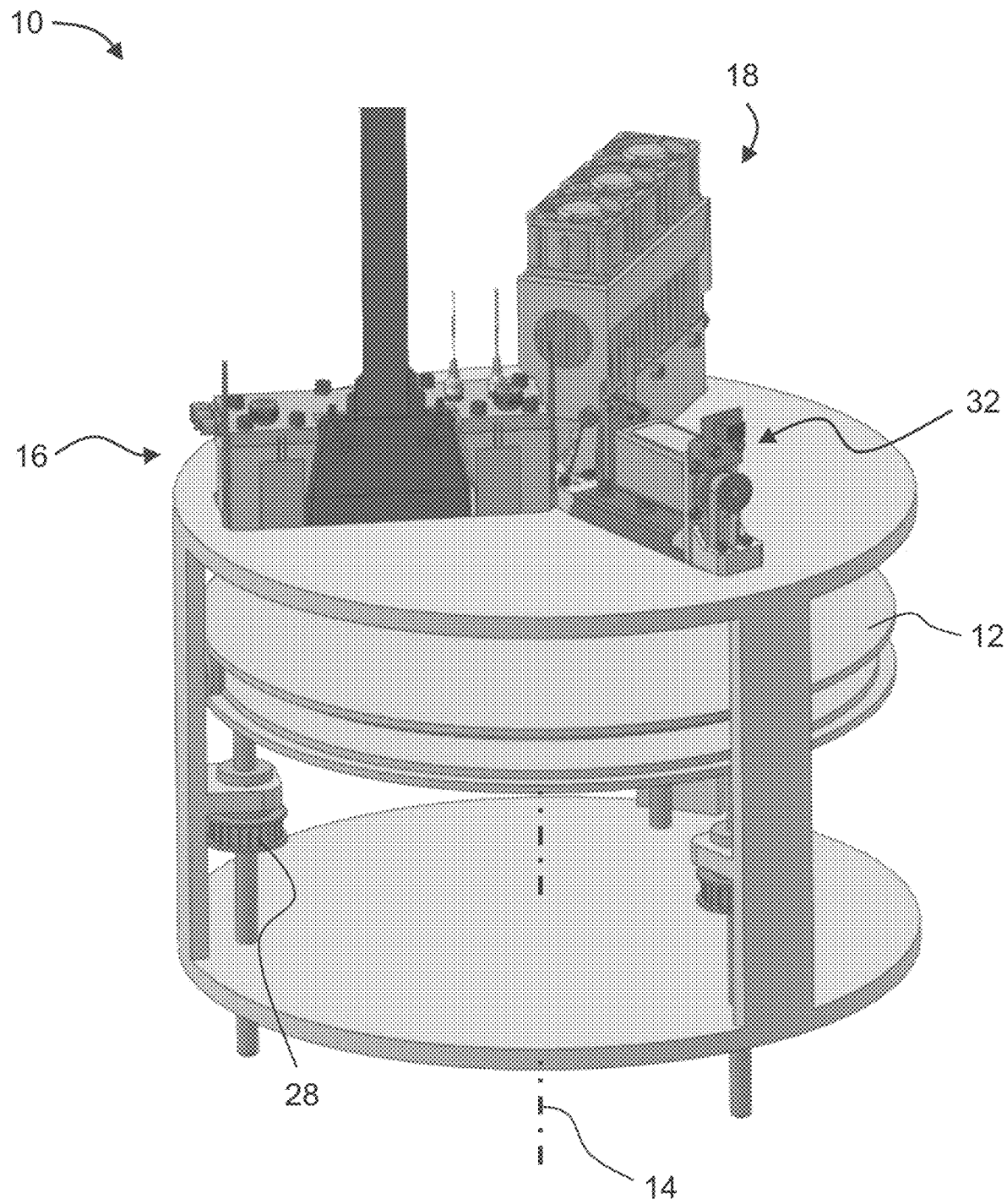

Another representative and non-limiting example of a system 10 suitable for AM of an object according to some embodiments of the present invention is illustrated in FIGS. 1B-1D. FIGS. 1B-1D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-2B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
FIGS. 3A-3B are schematic illustrations demonstrating coordinate transformations according to some embodiments of the present invention.
Figure 3B:
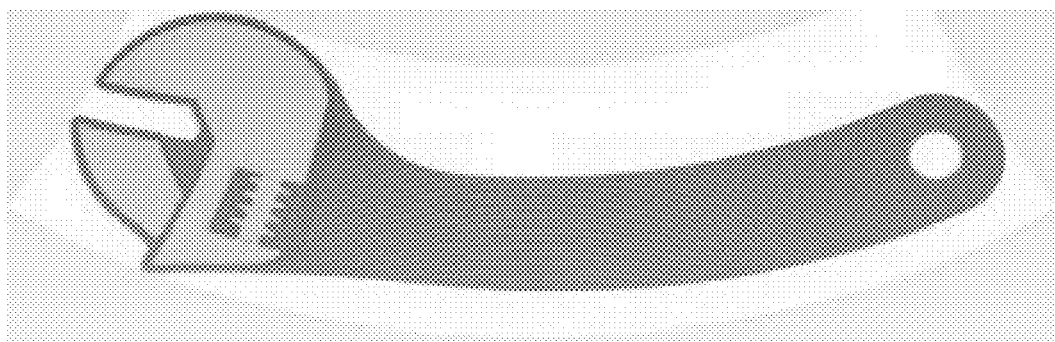

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-3B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Figure 4:
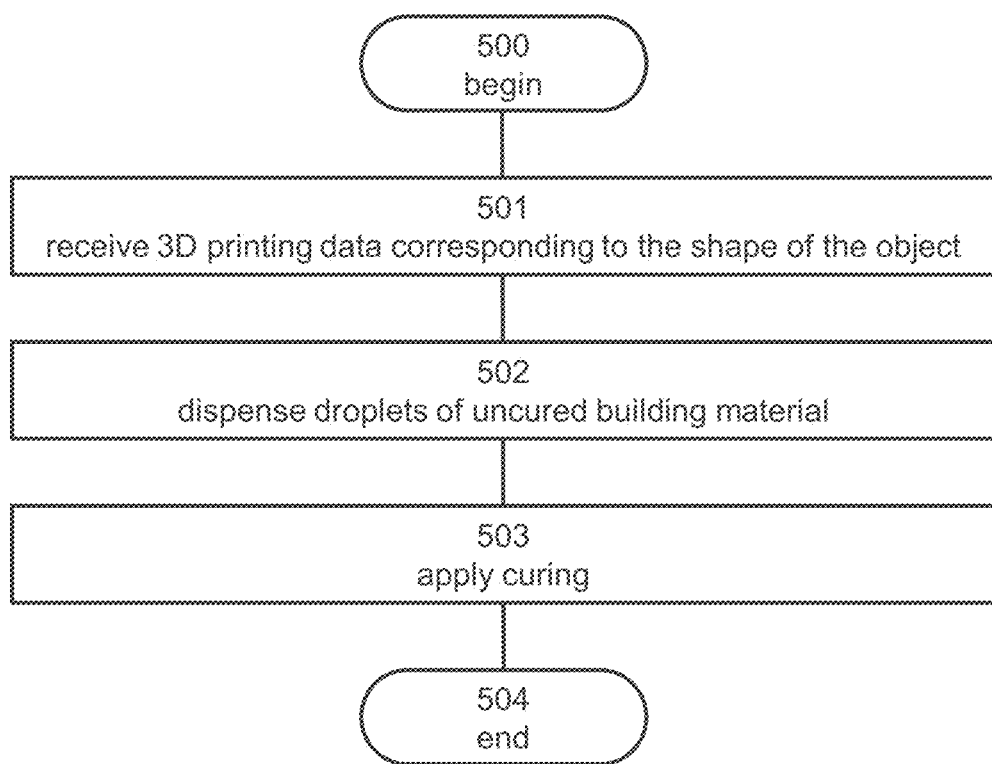
FIG. 4 is a simplified flow chart presenting an exemplary method of 3D inkjet printing of an object according to some embodiments of the present invention.

FIG. 4 presents a flowchart describing an exemplary method according to some embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The computer implemented method of the present embodiments can be embodied in many forms. For example, it can be embodied in on a tangible medium such as a computer for performing the method operations. It can be embodied on a computer readable medium, comprising computer readable instructions for carrying out the method operations. It can also be embodied in electronic device having digital computer capabilities arranged to run the computer program on the tangible medium or execute the instruction on a computer readable medium.

The method begins at 500 and optionally and preferably continues to 501 at which computer object data (e.g., 3D printing data) corresponding to the shape of the object are received. The data can be received, for example, from a host computer which transmits digital data pertaining to fabrication instructions based on computer object data, e.g., in a form of STL, SLC format, VRML, AMF format, DXF, PLY or any other format suitable for CAD.

The method continues to 502 at which droplets of the uncured building material as described herein (e.g., two or more modeling material formulations as described herein and optionally a support material formulation) are dispensed in layers, on a receiving medium, optionally and preferably using an AM system, such as, but not limited to, system 110 or system 10, according to the computer object data (e.g., printing data), and as described herein. In any of the embodiments described herein the dispensing 502 is by at least two different multi-nozzle inkjet printing heads and/or by at least two different nozzles. The receiving medium can be a tray of an AM system (e.g., tray 360 or 12) as described herein or a previously deposited layer.

In some embodiments of the present invention, the dispensing 502 is effected under ambient environment.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity as described herein in any of the respective embodiments.

The heating can be executed before loading the respective formulation into the printing head of the AM (e.g., 3D inkjet printing) system, or while the formulation is in the printing head or while the composition passes through the nozzle of the printing head.

In some embodiments, the heating is executed before loading of the respective formulation into the dispensing (e.g., inkjet printing) head, so as to avoid clogging of the dispensing (e.g., inkjet printing) head by the formulation in case its viscosity is too high.

In some embodiments, the heating is executed by heating the dispensing (e.g., inkjet printing) heads, at least while passing the modeling material formulation(s) through the nozzle of the dispensing (e.g., inkjet printing) head.

Once the uncured building material is dispensed on the receiving medium according to the computer object data (e.g., printing data), the method optionally and preferably continues to 503 at which a first curing condition (e.g., curing energy) is applied to the deposited layers, e.g., by means of a radiation source as described herein. Preferably, the curing is applied to each individual layer following the deposition of the layer and prior to the deposition of the previous layer.

In some embodiments, applying a curing energy is effected under a generally dry and inert environment, as described herein.

The method ends at 504.

In some embodiments, the method is executed using an exemplary system as described herein in any of the respective embodiments and any combination thereof.

The modeling material formulation(s) can be contained in a particular container or cartridge of a solid freeform fabrication apparatus or a combination of modeling material formulations deposited from different containers of the apparatus.

In some embodiments, at least one, or at least a few (e.g., at least 10, at least 20, at least 30 at least 40, at least 50, at least 60, at least 80, or more), or all, of the layers is/are formed by dispensing droplets, as in 202, of a formulation system, as described herein in any of the respective embodiments.

In some embodiments, at least one, or at least a few (e.g., at least 10, at least 20, at least 30 at least 40, at least 50, at least 60, at least 80, or more), or all, of the layers is/are formed by dispensing droplets, as in 202, of two or more modeling material formulations, as described herein in any of the respective embodiments, each from a different dispensing (e.g., inkjet printing) head and/or nozzle.

These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

Some of the embodiments thus enable the deposition of a broad range of material combinations, and the fabrication of an object which may consist of multiple different combinations of materials, in different parts of the object, according to the properties desired to characterize each part of the object.

In some exemplary embodiments of the invention an object is manufactured by dispensing a building material (uncured) that comprises two or more different modeling material formulations, each modeling material formulation from a different dispensing head and/or nozzle of the inkjet printing apparatus. The modeling material formulations are optionally and preferably deposited in layers during the same pass of the printing heads. The modeling material formulations and/or combination of formulations within the layer are selected according to the desired properties of the object, and as further described in detail hereinbelow.

The phrase "digital materials", abbreviated as "DM", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

In some of these embodiments, the two or more modeling material formulations are dispensed in a voxelated manner, wherein voxels of one of said modeling material formulations are interlaced with voxels of at least one another modeling material formulation.

In some embodiments of the present invention a "Drop on Drop" printing protocol is employed. These embodiments are schematically illustrated in FIGS. 5A and 5B. A bitmap suitable for the deposition of the first modeling material formulation is illustrated in FIG. 5A and a bitmap suitable for the deposition of the second modeling material formulation is illustrated in FIG. 5B. White boxes represent vacant locations, dotted boxes represent droplets of the first modeling material formulation and wavy boxes represent droplets of the second modeling material formulation. The printing data in these embodiments are such that for each layer, both modeling material formulations are deposited at the same location, but different times, during movement of the printing head. For example, each droplet of a first modeling material formulation can be jetted on top of a droplet of a second modeling material formulation, or vice versa. Preferably, but not necessarily, the two formulation parts are jetted in drops at the same weight and/or rate. These embodiments are particularly useful when the desired weight ratio between the first and second formulations is 1:1. For other desired weight ratios, the two formulation parts are preferably jetted in drops of different weights, wherein the ratio of the weights corresponds to the desired ratio.

A representative example for a resolution suitable for the present embodiments is 1200 dpi in the X direction and 300 dpi in the Y direction. The drop on drop printing protocol allows the two types of drops to combine and mix before the crystallization of deposited material.

In some embodiments of the present invention a "side by side" printing protocol is employed. These embodiments are schematically illustrated in FIGS. 6A and 6B. A bitmap suitable for the deposition of the first modeling material formulation is illustrated in FIG. 6A and a bitmap suitable for the deposition of the second modeling material formulation is illustrated in FIG. 6B. The white, dotted and wavy boxes represent vacant locations, droplets of the first modeling material formulation and droplets of the second modeling material formulation, respectively. The printing data in these embodiments is such that for each layer, each drop of a first modeling material formulation is jetted adjacent to a drop of a second modeling material formulation, or vice versa. Due to drop spreading, the adjacent drops tend to partially overlap. As a result, the two drops diffuse toward each other, mix and react after deposition.

In the schematic illustrations shown in FIGS. 5A-6B, chessboard bitmaps are illustrated, but this need not necessarily be the case, since, for some applications, other bitmap patterns can be employed.

In some of any of the embodiments of the present invention, once a layer is dispensed as described herein, exposure to a curing condition (e.g., curing energy) as described herein is effected. The curing condition to which each of the dispensed layers is exposed during the AM process (e.g., the 3D inkjet printing) is referred to herein as a first curing condition.

In some embodiments, where the building material comprises also support material formulation(s), the method proceeds to removing the hardened support material. This can be performed by mechanical and/or chemical means, as would be recognized by any person skilled in the art.

In some of any of the embodiments described herein, the method further comprises exposing the cured or partially cured modeling material, either before or after removal of a support material, if such has been included in the building material, to a post-treatment condition. The post-treatment condition is typically aimed at further hardening the green body obtained upon exposure to the first curing condition and optionally removal of the support material.

In some embodiments, the post-treatment hardens a partially-hardened material to thereby obtain a hardened material.

In some embodiments, the post-treatment is effected by exposure to heat or radiation, as described in any of the respective embodiments herein. In some embodiments, when the condition is heat (thermal post-treatment), the post-treatment can be effected for a time period that ranges from a few minutes (e.g., 10 minutes) to a few hours (e.g., 1-24 hours).

In some embodiments, the thermal post treatment comprises gradual exposure of the object to heat of at least 200° C., e.g., 250° C. For example, the object is exposed to a first temperature (e.g., 80-100° C.) for a first time period, then to a second, higher temperature (e.g. 150° C. or 200° C.) for a second time period, then to a third, yet higher temperature (e.g., 200° C. or 250° C.), for a third time period. Each time period can be from 1 to 4 hours.

Exposing to a post-treatment condition is also referred to herein as exposing the plurality of layers to a second curing condition.

While conceiving the present invention, the present inventors have sought for a formulation system that will exhibit a desired viscosity (e.g., of no more than 50 centipoises) at the inkjet printing heads. While such a viscosity can be typically obtained for a formulation that comprises a cyanate ester at a temperature above 65° C., at such a temperature, an activating agent that contacts the cyanate ester can promote polymerization, at least to some extent, such that the viscosity is increased and printheads clogging can be effected. On the other hand, if an activating agent that promotes polymerization of a cyanate ester at a higher temperature is used, no polymerization of the cyanate ester can be effected prior to application of elevated temperatures and leaching of the printed (e.g., green) body can be effected.

While searching for a solution to the above-mentioned limitations, the present inventors have selected activating agents which are nucleophilic agents, and which can promote polymerization of the cyanate ester to some extent also at low temperatures, at a kinetic that is suitable for a layer-by-layer additive manufacturing, and which can thus provide a certain degree of polymerization of the cyanate ester upon dispensing the formulations.

In addition, the present inventors have conceived utilizing a dual-cure formulation system, which further comprises an additional curable material that can be curable when exposed to a curing condition other than heat energy (e.g., elevated temperature). The present inventors have conceived that such curable materials that provide, when hardened, a material that features high Tg and/or high HDT, are preferred, so as to avoid possible deformation during printing.

The selection of such activating agents and an additional curable material allows obtaining, upon formation of a plurality of layers, a green body, as defined herein, that is partially cured, and which can be further cured when exposed to elevated temperatures.

In some embodiments, the obtained green body is self-supporting and does not undergo deformation.

Herein, the phrase "elevated temperature" describes a temperature higher than 80° C., or higher than 100° C., typically in a range of from 80° C. to 300° C.

The newly designed methodology employs a formulation system that comprises two (or more) modeling material formulations, in which one formulation (also referred to herein as Part A formulation) includes a cyanate ester and the other formulation (also referred to herein as Part B formulation) includes an activating agent that promotes polymerization of the cyanate ester to provide a polycyanurate material, when exposed to elevated temperatures (heat energy). Prior to dispensing the two formulations, the activating agent does not contact the cyanate ester and is therefore inactive towards its polymerization. When the formulations are dispensed and contact one another, the activating agent is still inactive or is not fully active (is partially active) towards promoting polymerization of the cyanate ester, as defined herein.

According to some of any of the embodiments described herein, each of the formulations in the formulation system features (before being exposed to a curing condition and before contacting the other formulation) a viscosity that is suitable for additive manufacturing such as 3D inkjet printing, that is, of from about 8 to about 50 centipoises (cps), or of from about 16 to about 50 centipoises, at the jetting temperature (the temperature of the dispensing heads, e.g., print heads). In some embodiments, the jetting temperature is 50-90° C., and in some embodiments it is 60-70° C. In some embodiments, the formulation features a viscosity of from about 20 to about 50 centipoises (cps), or from about 20 to about 40 centipoises, at 68° C.

According to the present embodiments, the formulation system comprises at least a first modeling material formulation (also referred to herein interchangeably as a first formulation or a part A formulation) which comprises a thermally-curable cyanate ester and a second modeling material formulation (also referred to herein interchangeably as a second formulation or a part B formulation) which comprises an activating agent for promoting polymerization of the cyanate ester and is devoid of the first curable material, thus preventing any contact between the activating agent and the cyanate ester prior to dispensing the formulations.

The formulation system thus comprises at least the first and the second formulations as described herein.

According to the present embodiments, the formulation system (the two or more modeling material formulations) further comprises a second curable material which is different from the first curable material (the cyanate ester), and optionally an agent for promoting hardening of the second curable material.

According to some of the present embodiments, the formulation system is selected such that once a layer is formed by dispensing the first and second formulations, and is exposed to the first curing condition, the second curable material polymerizes to a higher degree than the first curable material (the cyanate ester). In some embodiments, a degree of polymerization of the second curable material upon exposure to the first curing condition is at least 50%, or at least 60%, preferably at least 70%, or at least 80%, or at least 90%, and can be 100%. In some embodiments, a degree of polymerization of the second curable material upon exposure to the first curing condition is higher by at least 50%, or at least 60%, or by 100%, 150%, 200%, or more, than a degree of polymerization of the first curable material.

According to some of the present embodiments, the formulation system and the first curing condition are selected such that upon exposing a dispensed layer to the first curing condition, a degree of polymerization of the first curable material (the cyanate ester) is no more than 50%, or no more than 40%, or no more than 30%, preferably of no more than 20%, or no more than 10%.

According to some the present embodiments, the formulation system comprises at least two curable systems, each comprising a curable material and an agent for promoting polymerization of the curable material. The first curable system comprises the first curable material and an agent for promoting polymerization of the first curable material and the second curable system comprises a second curable material and an agent for promoting polymerization of the second curable material. The components of at least the first curable system are separated such that one formulation comprises the first curable material and is devoid of an agent that promotes polymerization of the first curable material and another formulation comprises an agent for promoting polymerization of the first curable material. Preferably, the components of the second curable system are also separated such that one formulation comprises the second curable material and is devoid of an agent that promotes polymerization of the second curable material and another formulation comprises an agent for promoting polymerization of the second curable material.

Additional curable systems, each comprising a curable material and optionally an agent for promoting polymerization of the respective curable material, can also be included. The components of additional curable system are also preferably separated such that one formulation comprises the curable material and is devoid of an agent that promotes polymerization thereof, and another formulation comprises an agent for promoting polymerization of the curable materials.

According to the present embodiments, the first curable material is a cyanate ester.

The phrase "cyanate ester" encompasses one or more cyanate ester compound(s) and/or one or more prepolymer(s) thereof, including homoprepolymer(s) and/or heteroprepolymer(s).

The prepolymers comprise a cyanate ester that is polymerized to a degree of conversion of the cyanate groups of from 1 or 5 percent to 20 or 40 percent (of the initial cyanate functionality), leading to prepolymers with molecular weights of from 200 or 400 g/mol to 4,000 or 8,000 g/mol.

A cyanate ester compound can be collectively represented by Formula I:

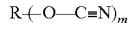   Formula I wherein:

m is an integer of from 1 to 6, and can be, for example, 1, 2, 3, 4, 5 or 6, preferably, 2, 3, 4 or 5, more preferably 2 or 3, for example 2; and R is alkyl, cycloalkyl, aryl, heteroaryl, or heteroalicyclic. Alternatively, R is a hydrocarbon (saturated or unsaturated) that is optionally interrupted and/or substituted by one or more heteroatoms such as Si, P, S, O, N.

In some embodiments, R is an aryl, for example, phenyl, naphthyl, anthryl, phenanthryl, or pyrenyl group, each being substituted or unsubstituted.

In some embodiments, R is an aryl such as phenyl, biphenyl, naphthyl, bis(phenyl)methane, bis(phenyl)ethane, bis(phenyl)propane, bis(phenyl)butane, bis(phenyl)ether, bis(phenyl)thioether, bis(phenyl)sulfone, bis(phenyl) phosphine oxide, bis(phenyl)silane, bis(phenyl)hexafluoropropane, bis(phenyl) trifluoroethane, or bis(phenyl)dicyclopentadiene, or a phenol formaldehyde resin, each being unsubstituted or substituted by, for example, 1-6 substituents.

Exemplary cyanate ester compounds include, but are not limited to, 1,3-, or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatoaphthalene; 2,2' or 4,4'-dicyanatobiphenyl; bis(4-cyanathophenyl) methane; 2,2-bis(4-cyanatophenyl) propane; 2,2-bis(3,5-dichloro-4-cyanatophenyl (propane. 2,2-bis(3-dibromo-4-dicyanatophenyl)propane; bis(4-cyanatophenyl)ether; bis(4-cyanatophenyl)thioether; bis(4-cyanatophenyl) sulfone; tris (4-cyanatophenyl)phosphite; tris(4-cyanatophenyl) phosphate; bis(3-chloro-4-cyanatophenyl)methane: 4-cyanatobiphenyl; 4-cumyl cyanato benzene; 2-tert-butyl-1,4-dicyanatobenzene; 2,4-dimethyl-1,3-dicyanatobenzene; 2,5-di-tert-butyl-1,4-dicyanatobenzene; tetramethyl-1,4-dicyanatobenzene; 4-chloro-1,3-dicyanatobenzene; 3,3',5, 5'-tetramethyl-4,4' dicyanatodiphenyl; bis(3-chloro-4-cyanatophenyl)methane; 1,1,1-tris(4-cyanatophenyl)ethane; 1,1-bis(4-cyanatophenyl)ethane; 2,2-bis(3,5-dichloro-4-cyanatophenyl)propane; 2,2-bis(3,5-dibromo-4-cyanatophenyl)propane; bis(p-cyanophenoxyphenoxy) benzene; and any mixture of the foregoing.

A cyanate ester of formula I in which m is 2 typically undergoes polymerization by forming a polycyanurate of the formula:

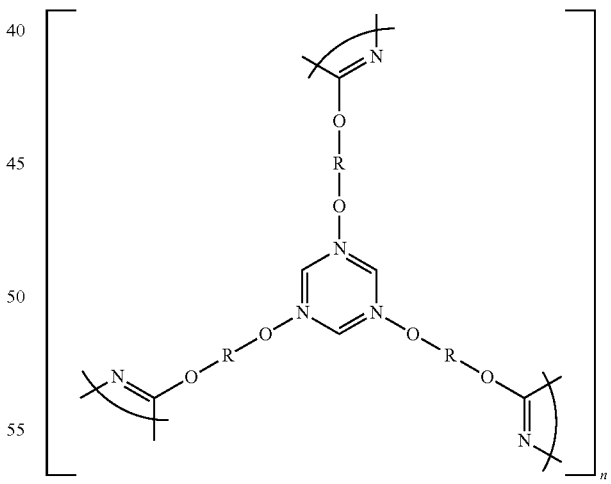

with R being as defined for Formula I.

In some of any of the embodiments described herein, the formulation system is devoid of a metal component.

In some of any of the embodiments described herein, the formulation system is devoid of a metal catalyst that promotes polymerization of a cyanate ester.

In some of any of the embodiments described herein, the formulation system is devoid of a metal catalyst as described in WO 2017/040883.

In the context of the present embodiments, an agent that promotes polymerization of a curable material is a chemical material that initiates and/or facilitates (increases the rate of, and/or reduces the energy required for) the polymerization and/or cross-linking of polymerizable materials.

In some embodiments, an agent that promotes polymerization is an initiator, which generates a reactive species that initiates and/or facilitates (increases the rate of, and/or reduces the energy required for) the reaction. For example, initiators of free-radical polymerization generate a free radical, and the presence of the free radical initiates and/or facilitates the free-radical polymerization. Similarly, initiators of cationic polymerization generate a cation; initiators of anionic polymerization generate an anion; and other initiators form other species that initiate or facilitate polymerization.

The agent that promotes polymerization (e.g., an initiator or an activator) can be active towards the polymerization when contacting a respective curable material, or, can be chemically inactive towards polymerization of curable materials, for example, it does not initiate or facilitate the polymerization and/or cross-linking of polymerizable materials, without being exposed to a curing condition. In such embodiments, the curing condition activates the initiator, typically such that it generates the reactive species which initiates and/or facilitates polymerization of respective polymerizable materials at its vicinity.

Initiators that are activated by irradiation are referred to herein and in the art as photoinitiators. Initiators that are activated by heat are referred to herein and in the art as thermal initiators. Initiators can alternatively be chemically activated by contacting another chemical agent, which is also known as an activator. Further alternatively, initiators can be activated by a curing condition, and generate a reactive species by contacting an activator.

According to some of any of the embodiments described herein, the agent for promoting polymerization of the cyanate ester is inactive (non-active, non-reactive) or is partially active (partially reactive) towards promoting polymerization of the cyanate ester prior to being exposed to the first curing condition and/or the second curing condition.

According to some of any of the embodiments described herein, the agent for promoting polymerization of the cyanate ester is inactive (non-active, non-reactive) or is partially active (partially reactive) towards promoting polymerization of the cyanate ester prior to being exposed to the second curing condition. That is, the agent for promoting polymerization of the cyanate ester remains inactive (non-active, non-reactive) or is partially active (partially reactive) towards promoting polymerization of the cyanate ester when exposed to the first curing condition.

According to some embodiments, the agent for promoting polymerization of the cyanate ester is activatable by exposure to the first curing condition and/or to the second curing condition.

According to some embodiments, the agent for promoting polymerization of the cyanate ester is activatable by exposure to the first curing condition and to the second curing condition.

By "inactive", or "non-reactive", or "partially active" it is meant that when the agent contacts the first curable material (the cyanate ester), and optionally exposed to a curing condition (e.g., a first curing condition), polymerization of no more than 30%, or no more than 20%, or no more than 10% of the curable material occurs within the time period that ranges from dispensing one layer to dispensing a subsequent layer (typically in a range of from few milliseconds to few minutes, including any intermediate values and subranges therebetween).

According to some embodiments of the present invention, an agent that promotes polymerization of the first curable material (a cyanate ester) is a nucleophile, that is, a compound that comprises a nucleophilic group that is reactive towards cyanate ester. Exemplary nucleophilic groups include amines, thiolates, hydroxides, alkoxides, etc.

In some of any of the embodiments described herein, the agent that promotes polymerization of the first curable material is non-reactive towards polymerization of the second curable material, and optionally any other curable material(s), if present, at the jetting temperature (e.g., at 50-90° C.) when it is not exposed to the first curing condition. Optionally, the agent that promotes polymerization of the first curable material is non-reactive towards the second curable material, and optionally towards any other curable material(s), if present, also upon exposure to the first curing condition.

By "non-reactive" or "non-active" towards polymerization of an indicated (e.g., second) curable material it is meant that when the agent that promotes polymerization of the first curable material contacts the other curable material at the jetting temperature, a polymerization of no more than 10% by mol of the other (e.g., second) curable material(s) occurs within 1 minute. The polymerization degree can be determined by a change in a viscosity, which is minimal or nullified.

In some embodiments, an agent is determined as non-reactive or non-active towards an indicated polymerization by determining a change in a viscosity of a mixture of the agent and the respective curable material, when the mixture is subjected to certain condition. The condition can be, for example, the jetting temperature or a curing condition (e.g., a first curing condition). A change in the viscosity of the mixture of no more than 10% within a relevant time period (e.g., 1 minute) is indicative of the agent being non-reactive towards the polymerization.

In some embodiments, when the second curable material and the agent that promotes curing of the first material are mixed, the resulting mixture, when maintained at 65° C. for 2 weeks, exhibits a change in the viscosity that is no more than 10%, or no more than 5%, or no more than 2%.

Any nucleophilic compound that is usable in the context of promoting polymerization of a cyanate ester, and which is non-reactive towards the second curable material, and optionally any other curable material(s), if present, is contemplated.

In exemplary embodiments, the agent that promotes polymerization of the first curable material is a thiol compound, that is, a compound that comprises one or more thiol groups.

As is known in the art, thiols can be activated to form a thiolate, which is a reactive nucleophilic species in the polymerization of cyanate esters.

In some embodiments, the thiol compound comprises one or more thiol groups attached to one or more carbon atoms, and these one or more carbon atoms are further substituted by e.g., an alkyl such as methyl.

Exemplary thiol compounds are those belonging to the family marketed under the trade name Karenz.

In some embodiments, a curable system of a cyanate ester that comprises a thiol compound as an agent that promotes polymerization of a cyanate ester, preferably further comprises an agent for generating a thiolate species.

In some embodiments, such an agent is a base, for example, an amine, preferably a tertiary amine.

In some embodiments, the agent that generates a thiolate is a photobase, which generates a base upon exposure to irradiation. An exemplary photobase is such that generates a base such as a tertiary amine upon exposure to irradiation.

In some embodiments, a first curable system in the formulation system comprises a cyanate ester as described herein, a thiol as an agent that promotes polymerization of a cyanate ester and a base for activating the thiol by generating a thiolate. In some of these embodiments, the cyanate ester and the base are included in the first formulation and the thiol is included in the second formulation.

In some of these embodiments, the base is a photobase that generates a tertiary amine when exposed to irradiation.

An exemplary such curable system is presented in FIG. 8, and the reactions that are performed during the process are presented in FIG. 9.

A thiol is an example of an agent for promoting polymerization of the cyanate ester that is activatable by exposure to the first curing condition (when a thiolate group is generated) and to the second curing condition (when the thiolate promotes the polymerization).

In exemplary embodiments, the agent that promotes polymerization of the first curable material is an amine, that is, a compound that comprises one or more amine groups.

As shown in FIG. 10, amines are highly reactive towards polymerization of a cyanate ester at substantially lower temperatures compared to other activators.

The amine can be an aromatic or non-aromatic (aliphatic or alicyclic) amine.

The amine can be a primary, secondary or tertiary amine, and is preferably primary or secondary amide.

In some embodiments, the amine is an aromatic amine, comprising an aryl substituted by one or more amine groups and/or by one or more substituents that comprise an amine group, and optionally by one or more additional substituents. Each of the amine substituent(s) can be independently a primary or secondary amine.

Exemplary aromatic amines are marketed under the trade name Ethacure 100 LC (primary amines), Ethacure 320 (primary amines) and Ethacure 420 (secondary amines).

In some embodiments, the amine is a secondary amine.

In some embodiments, the amine is a secondary aromatic amine, which comprises an aryl substituted by one or more amine-containing substituents, wherein one or more of the amine-containing substituents is a secondary amine.

An amine (e.g., as described herein) is active towards polymerization of a cyanate ester when exposed to heat, e.g., to a temperature of 80° C. or more.

An amine (e.g., an aromatic amine) is an example of an agent for promoting polymerization of the cyanate ester that is activatable by exposure to the second curing condition.

In some embodiments, a first curable system in the formulation system comprises a cyanate ester as described herein, and an amine (e.g., an aromatic amine) as an agent that promotes polymerization of a cyanate ester. The cyanate ester is included in the first formulation and the amine is included in the second formulation.

In some of any of the embodiments described herein, the agent that promotes polymerization of the cyanate ester is inactive or is partially active, towards the polymerization, as defined herein, when exposed to the first curing condition. In some embodiments, when the agent is activatable upon exposure to the first curing condition, it still remains inactive or partially active towards polymerization of the cyanate ester before being exposed to the second curing condition.

According to some of the present embodiments, the first curable system is selected such that when the first curable material, the agent that promotes polymerization of the first curable material and the agent that activates it, if present, contact one another and exposed to the first curing condition, polymerization of no more than 30%, or no more than 20% or no more than 10% of the cyanate ester occurs.

In some of any of the embodiments described herein, the agent that promotes polymerization of the cyanate ester is active towards the polymerization upon exposure to heat (heat energy), e.g., to elevated temperature as described herein (e.g., above 80° C. or above 100° C.).

In some of any of the embodiments described herein, the first curing condition does not comprise application of heat at above 70° C., preferably at above 50° C.

In some embodiments, the first curing condition is devoid of application of heat.

In some embodiments, the first curing condition is selected so as to effect polymerization of at least 50% or at least 60% or at least 70% or at least 80% of the second curable material.

In some embodiments, the first curing condition comprises irradiation, preferably without application of heat as described herein.

In some of any of the embodiments described herein the second curable system is a photocurable system, for example, a UV-curable system, and the second curable material is a photocurable material, for example, a UV-curable material.

In some embodiments, the second curable system further comprises an agent that promotes polymerization of the second curable material, preferably upon exposure to the first curing condition. In exemplary embodiments, this agent is a photoinitiator.

In some of any of the embodiments described herein, the agent the promotes polymerization of the second curable material is included in the first formulation and the second curable material is included in the second formulation.

In some of any of the embodiments described herein, the first formulation comprises the first curable material and an agent that promotes hardening of the second curable material (e.g., a photoinitiator) and the second formulation comprises the second curable material (e.g., a UV-curable material) and the agent that promotes polymerization of the cyanate ester. In some of these embodiments, the first formulation further comprises an agent that activates the agent that promotes hardening of the cyanate ester.

In some of any of the embodiments described herein, the agent that promotes polymerization of the second curable material is inactive or is partially active, as defined herein, towards polymerization of the cyanate ester.

Exemplary such agents are devoid of a group that is active towards polymerization of the cyanate ester at the jetting temperature as described herein. In exemplary embodiments, such agents are devoid of a nucleophilic group as described herein. In some embodiments, it is devoid of a tertiary amine, and/or hydroxy and/or thiol and/or thioether. In some embodiments, it is devoid of hydroxy.

Exemplary photoinitiators that are usable in the context of the present embodiments are described in the Examples section that follows.

In some embodiments, the second curable system comprises acrylic compounds and/or other photocurable materials that are polymerizable by free-radical polymerization and the photoinitiator is a free-radical photoinitiator.

A free-radical photoinitiator may be any compound that produces a free radical on exposure to radiation such as ultraviolet or visible radiation and thereby initiates a polymerization reaction of the acrylic material, as long as it does not include, generate or require a nucleophile as described herein, and is preferable soluble in the cyanate ester.

A free-radical photoinitiator may be any compound that produces a free radical on exposure to radiation such as ultraviolet or visible radiation and thereby initiates a polymerization reaction of the acrylic material, as long as it does not include, generate or require a nucleophile as described herein, and is preferably soluble in the cyanate ester.

Exemplary photoinitiators include benzophenones, aromatic α-hydroxy ketones, benzylketals, aromatic α-aminoketones, phenylglyoxalic acid esters, mono-acylphosphinoxides, bis-acylphosphinoxides, tris-acylphosphinoxides and/or oximesters derived from aromatic ketones.

Exemplary photoinitiators include, but are not limited to, camphor quinone; benzophenone, benzophenone derivatives, such as 2,4,6-trimethylbenzophenone, 2-methylbenzophenone, 3-methylbenzo-phenone, 4-methylbenzophenone, 2-methoxycarbonylbenzophenone 4,4'-bis(chloromethyl)-benzophenone, 4-chlorobenzophenone, 4-phenylbenzophenone, 3,3'-dimethyl-4-methoxy-benzophenone, [4-(4-methylphenylthio)phenyl]-phenylmethanone, methyl-2-benzoyl-benzoate, 3-methyl-4'-phenylbenzophenone, 2,4,6-trimethyl-4'-phenylbenzophenone, 4,4'-bis(dimethylamino)benzophenone, 4,4'-bis(diethylamino) benzophenone; thioxanthones, thioxanthone derivatives, polymeric thio-xanthones as for example OMNIPOL TX; ketal compounds, as for example benzyldimethyl-ketal (IRGACURE® 651); acetophenone, acetophenone derivatives, for example α-hydroxy-cycloalkyl phenyl ketones or α-hydroxyalkyl phenyl ketones, such as for example 2-hydroxy-2-methyl-1-phenyl-propanone (DAROCUR® 1173), 1-hydroxy-cyclohexyl-phenyl-ketone (IRGACURE® 184), 1-(4-dodecylbenzoyl)-1-hydroxy-1-methyl-ethane, 1-(4-isopropylbenzoyl)-1-hydroxy-1-methyl-ethane, 1-[4-(2-hydroxyethoxy)-phenyl]-2-hydroxy-2-methyl-1-propan-1-one (IRGACURE® 2959); 2-hydroxy-1-{4-[4-(2-hydroxy-2-methyl-propionyl)-benzyl]-phenyl}-2-methyl-propan-1-one (IRGACURE® 127); 2-hydroxy-1-{4-[4-(2-hydroxy-2-methyl-propion-yl)-phenoxy]-phenyl}-2-methyl-propan-1-one; dialkoxyacetophenones, α-hydroxy- or α-am-inoacetophenones, e.g., (4-methylthiobenzoyl)-1-methyl-1-morpholinoethane (IRGACURE® 907), (4-morpholinobenzoyl)-1-benzyl-1-dimethylaminopropane (IRGACURE® 369), (4-morpholinobenzoyl)-1-(4-methylbenzyl)-1-dimethylaminopropane (IRGACURE® 379), (4-(2-hydroxyethyl)aminobenzoyl)-1-benzyl-1-dimethylaminopropane), (3,4-dimethoxybenzoyl)-1-benzyl-1-dimethyl aminopropane; 4-aroyl-1,3-dioxolanes, benzoin alkyl ethers and benzyl ketals, e.g. dimethyl benzyl ketal, phenylglyoxalic esters and derivatives thereof, e.g., methyl α-oxo benzeneacetate, oxo-phenyl-acetic acid 2-(2-hydroxy-ethoxy)-ethyl ester, dimeric phenylglyoxalic esters, e.g. oxo-phenyl-acetic acid 1-methyl-2-[2-(2-oxo-2-phenyl-acetoxy)-propoxy]-ethyl ester (IRGACURE® 754); ketosulfones, e.g. ESACURE KIP 1001 M®; oxime-esters, e.g., 1,2-octanedione 1-[4-(phenylthio)phenyl]-2-(O-benzoyloxime) (IRGACURE® OXE01), ethanone 1-[9-ethyl-6-(2-methyl-benzoyl)-9H-carbazol-3-yl]-1-(O-acetyloxime) (IRGACURE® OXE02), 9H-thioxanthene-2-carboxaldehyde 9-oxo-2-(O-acetyloxime), peresters, benzophenone tetracarboxylic peresters, monoacyl phosphine oxides, e.g. (2,4,6-trimethylbenzoyl)diphenylphosphine oxide (DAROCUR® TPO), ethyl(2,4,6 trimethylbenzoyl phenyl)phosphinic acid ester; bisacyl-phosphine oxides, e.g., bis(2,6-dimethoxy-benzoyl)-(2,4,4-trimethyl-pentyl)phosphine oxide, bis(2,4, 6-trimethylbenzoyl)-phenylphosphine oxide (IRGACURE® 819), bis(2,4,6-trimethyl-benzoyl)-2,4-dipentoxyphenylphosphine oxide, trisacylphosphine oxides, halomethyl-triazines, e.g., 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichlorome-thyl-[1,3,5]triazine, 2-methyl-4,6-bis-trichloromethyl-[1,3,5]triazine, hexaarylbisimidazole/co-initiators systems, e.g., ortho-chlorohexaphenyl-bisimidazole combined with 2-mercapto-benzthiazole, ferrocenium compounds, or titanocenes, e.g., bis(cyclopentadienyl)-bis(2,6-difluoro-3-pyrryl-phenyl)titanium (IRGACURE®784).

Exemplary alpha-hydroxy ketone PIs include, but are not limited to, 1-hydroxy-cyclohexyl-phenyl-ketone (IRGACURE® 184, I-184), 2-hydroxy-1-{1-[4-(2-hydroxy-2-methyl-propionyl)-phenyl]-1,3,3-trimethyl-indan-5-yl}-2-methyl-propan-1-one, (ESACURE ONE®), and 1-[4-(2-hydroxyethoxy)-phenyl]-2-hydroxy-2-methyl-1-propan-1-one (IRGACURE® 2959, 1-2959).

According to some of any of the embodiments described herein, the photoinitiator(s) comprises, or consists essentially of, a phosphine oxide-type (e.g., mono-acylated or bis-acylated phosphine oxide-type; BAPO or BPO) photoinitiator.

Exemplary monoacyl and bisacyl phosphine oxides include, but are not limited to, 2,4,6-trimethylbenzoyldiphenyl phosphine oxide, bis(2,4,6-trimethylbenzoyl) phenylphosphine oxide, dibenzoylphenylphosphine oxide, bis (2,6-dimethoxybenzoyl)phenyl phosphine oxide, tris(2,4-dimethylbenzoyl) phosphine oxide, tris(2-methoxybenzoyl) phosphine oxide, 2,6-dimethoxybenzoyldiphenyl phosphine oxide, 2,6-dichlorobenzoyldiphenyl phosphine oxide, 2,3,5, 6-tetramethylbenzoyldiphenyl phosphine oxide, benzoyl-bis (2,6-dimethylphenyl) phosphonate, and 2,4,6-trimethylbenzoylethoxyphenyl phosphine oxide. Commercially available phosphine oxide photoinitiators capable of free-radical initiation when irradiated at wavelength ranges of greater than about 380 nm to about 450 nm include bis(2,4,6-trimethyl-benzoyl)phenyl phosphine oxide (IRGACURE 819), bis(2, 6-dimethoxybenzoyl)-(2,4,4-trimethylpentyl) phosphine oxide (CGI 403), a 25:75 mixture, by weight, of bis(2,6-dimethoxybenzoyl)-2,4,4-trimethylpentyl phosphine oxide and 2-hydroxy-2-methyl-1-phenylpropan-1-one (IRGACURE 1700), a 1:1 mixture, by weight, of bis(2,4,6-trimethylbenzoyl)phenyl phosphine oxide and 2-hydroxy-2-methyl-1-phenylpropane-1-one (DAROCUR 4265), and ethyl 2,4,6-trimethylbenzylphenyl phosphinate (LUCIRIN LR8893X).

In some of any of the embodiments described herein, the agent that promotes polymerization of the second curable material is soluble or dispersible in the first curable material, that is an amount and type of this agent is such that allows jetting the second formulation without forming larger particles that may cause clogging of the printheads and/or nozzles.

In some of any of the embodiments described herein, the second curable material is a UV-curable acrylic material, or a combination of two or more acrylic materials.

In some of any of the embodiments described herein the second curable material is selected such that is provides, when hardened, a Tg of at least 150° C.

In some of any of the embodiments described herein, the second curable material comprises one or more, multi-functional curable materials.

In some of any of the embodiments described herein, the second curable material comprises one or more multifunctional curable materials and at least one of these materials provides, when hardened, a Tg of at least 150° C.

In some of any of the embodiments described herein, the second curable material comprises one or more multi-functional curable materials and the type and amount of these materials are selected to provide, when hardened, an average Tg of at least 150° C.

Herein throughout, an average Tg means a sum of the Tg of each component multiplied by its relative weight portion divided by the sum of the respective weight portions.

For example, if material A is included in an amount of X weight percent and features Tg1, and a material B is included in an amount of Y weight percent and features Tg2, then an average Tg of materials A and B is calculated herein as:

$$\text{Average } Tg = (X \times Tg1 + Y \times Tg2)/X + Y.$$

Exemplary difunctional curable materials which are usable in the context of the present embodiments are collectively represented by Formula II:

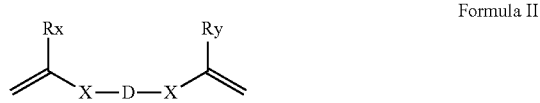

Formula II wherein:

X is selected from —O— and —O—C(=O)—;

D is a hydrocarbon as defined herein in any of the respective embodiments; and

Rx and Ry are each independently selected from hydrogen, alkyl and cycloalkyl.

When X is O, the difunctional curable material is a divinyl ether.

When X is —O—C(=O)— the difunctional curable material is a di(meth)acrylate.

When X is —O—C(=O)— and Rx and Ry are each hydrogen, the difunctional material is a diacrylate.

When X is —O—C(=O)— and Rx and Ry are each methyl, the difunctional material is a dimethacrylate.

In some of any of the embodiments described herein, the difunctional curable material is a divinyl ether as depicted in Formula II.

In some of any of the embodiments described herein, the difunctional curable material is a dimethacrylate as depicted in Formula II.

In some of any of the embodiments defined herein, the hydrocarbon is or comprises a rigid moiety, for example, a cyclic moiety such as a cycloalkyl (an alicyclic moiety) and/or an aryl (e.g., phenyl) or alkaryl (e.g., benzyl).

Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), Dipentaerythitol Penta-acrylate (DiPEP), and an aliphatic urethane diacrylate, for example, such as marketed as Ebecryl 230, ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

Examples of multi-functional (meth)acrylates that feature a Tg higher than 150° C. and are usable in the context of the respective embodiments include, but are not limited to, materials marketed by Sartomer under the trade names SR834, SR444D, SR368, SR833s, SR351, SR355 and SR299. Other materials are also contemplated.

In some embodiments, the second curable material comprises a di-functional acrylic material, preferably a di-functional acrylate or methacrylate.

In some embodiments, the second curable material comprises a di-functional acrylic material, preferably a di-functional acrylate or methacrylate, and another multi-functional acrylate or methacrylate, such as a tri-functional or tetra-functional acrylate or methacrylate.

In some of these embodiments, a weight ratio of the di-functional acrylate or methacrylate and the other multi-functional acrylate or methacrylate ranges from about 10:1 to 2:1, including any intermediate value and subranges therebetween.

The second curable material can alternatively be mono-functional or comprise one or more monofunctional curable materials such as monofunctional acrylates and/or methacrylates.

In some of any of the embodiments described herein, an amount of the agent that promotes polymerization of the cyanate ester in the second formulation ranges from about 5 to 25, or from about 8 to about 20, weight percents of the total weight of the second formulation, including any intermediate values and subranges therebetween.

In exemplary embodiments, the agent that promotes polymerization of the first curable material is a thiol compound, and an amount of the thiol compound ranges from 10 to 25 weight percent of the total weight of the second formulation. As shown in FIGS. 8 and 9, a portion of the thiol compound may react radically with the second curable material upon exposure to the first curing condition and hence its amount is preferably relatively high (so as to assure that a sufficient amount of the thiol compound remains unreacted for effecting polymerization of the cyanate ester).

In exemplary embodiments, the agent that promotes polymerization of the first curable material is an amine compound, and an amount of the amine compound ranges from 5 to 15 weight percent of the total weight of the second formulation.

In some of any of the embodiments described herein, an amount of the agent that promotes polymerization of the second curable material in the first formulation ranges from about 0.1 to about 5 or from about 0.1 to about 3, or from about 0.5 to about 3, or from about 0.5 to about 2, or from about 0.5 to about 1.5, weight percent of the total weight of the first formulation, including any intermediate values and subranges therebetween.

In some of any of the embodiments described herein, one or more of the modeling material formulations further comprises a metal species that promotes polymerization of the cyanate ester, which is also referred to herein as a metal catalyst.

Any metal-based material that is known in the art to promote polymerization of a cyanate ester (as a metal catalyst) is contemplated. These include, for example, a chelate or oxide of a metal such as copper, zinc, manganese, tin, lead, cobalt, nickel, iron, aluminum, or titanium, or a metal salt of an organic acid, which the metal is copper, zinc, lead, nickel, iron, tin, or cobalt.

The metal species is preferably not included in the first formulation, and can be included in the second formulation or in an additional modeling formulation.

In some embodiments, the metal species is included in the second formulation, and is selected so as to be dissolvable or dispersible in this formulation.

An exemplary metal species comprises a complex of zinc ions and an organic moiety, preferably a hydrophobic moiety, such as, but not limited to, zinc neodecanoate.

In some embodiments, an amount of the metal species (metal catalyst) ranges from about 0.01 to about 0.5% by weight, or from about 0.01 to about 0.2% by weight, of the total weight of the formulation containing same (e.g., the second formulation).

In some of any of the embodiments described herein the two or modeling material formulations used in the method as described herein further comprises an additional curable material which is capable of interacting with the cyanate ester to thereby form a co-polymeric network. Such a material can optionally be regarded as part of the first curable material, as it forms a part of the polymeric network made of the cyanate ester.

In some of any of the embodiments described herein the additional curable material is capable of interacting with the cyanate ester upon exposure to the first and/or the second curing condition.

In some of any of the embodiments described herein the additional curable material is capable of interacting with the cyanate ester upon exposure to the first curing condition.

In some of any of the embodiments described herein the additional curable material is capable of interacting with the cyanate ester upon exposure to the second curing condition.

An exemplary such material is an epoxy-containing curable material.

Epoxy-containing curable materials comprise one or more curable epoxy groups which substitute an aromatic, aliphatic or alicyclic moiety.

Herein throughout, "an aromatic moiety" describes a moiety that is or comprises one or more aryl or heteroaryl groups.

Herein throughout, "an aliphatic moiety" describes a moiety that does not comprise an aryl or heteroaryl group, and which can be non-cyclic or cyclic, in which case it is also referred to herein as an alicyclic moiety.

In some of any of the embodiments described herein, the additional curable material features a viscosity lower than 1,000, or lower than 500, centipoises, at room temperature.

In some of any of the embodiments described herein, the epoxy-containing curable material features a viscosity lower than 1,000, or lower than 500, centipoises, at room temperature. Exemplary such materials are typically aliphatic or alicyclic epoxy-containing materials, which can be mono-functional or multi-functional.

Exemplary epoxy-containing curable materials include, but are not limited to, Bis-(3,4 cyclohexylmethyl) adipate, 3,4-epoxy cyclohexylmethyl-3,4-epoxycyclohexyl carboxylate, 1,2 epoxy-4-vinylcyclohexane, 1,2-epoxy hexadecane, 3,4-epoxy cyclohexylmethyl-3,4-epoxy cyclohexane carboxylate, which is available, for example, under the trade name UVACURE 1500 from Cytec Surface Specialties SA/NV (Belgium) and mono or multifunctional silicon epoxy resins such as PC 1000 which is available from Polyset Company (USA).

In some of any of the embodiments described herein, the additional curable material (e.g., epoxy-containing material) is not included in the first formulation.

In some of any of the embodiments described herein, the additional curable material (e.g., epoxy-containing material) is included in the second formulation.

An amount of the additional curable material can be selected as desired and in accordance with considerations such as the mechanical properties of the obtained cyanate ester-containing polymeric network and costs.

In some embodiments, an amount of the additional curable material, when included in the second formulation, and the weight ratio of the first and second formulation, are selected such that a total weight of the cyanate ester and the additional curable material ranges from about 60 to about 80 weight percent of the total weight of the first and second formulations. The following describes exemplary, non-limiting, formulation systems usable in the context of the present embodiments.

A first exemplary formulation system comprises a first formulation which comprises a cyanate ester and a photoinitiator as described herein and a second formulation which comprises one or more multi-functional acrylates or methacrylates and an aromatic amine. In some of these embodiments the aromatic amine is or comprises a secondary aromatic amine.

In some of any of these embodiments, a total amount of the multi-functional acrylic material ranges from 20 to 40, or from 20 to 30, or from 25 to 30, % by weight, of the total weight of the first and second formulations.

In some of these embodiments, an amount of the aromatic amine ranges from 2 to 4, % by weight of the total weight of the first and second formulations.

A second exemplary formulation system comprises a first formulation which comprises a cyanate ester and a photoinitiator as described herein and a second formulation which comprises one or more multi-functional acrylates or methacrylates and a thiol compound. In some embodiments of this exemplary formulation system, the photoinitiator generates a tertiary amine when exposed to the first curing condition.

An exemplary formulation system comprises a first formulation which comprises the first curable material and a photoinitiator and a second formulation which comprises a multi-functional acrylic material that features, when hardened, an average Tg of at least 150° C., and an aromatic amine.

In some of these embodiments, the aromatic amine is a secondary aromatic amine.

In some of any of these embodiments, a total amount of the multi-functional acrylic material ranges from 20 to 40, or from 20 to 30, or from 25 to 30, % by weight, of the total weight of the first and second formulations.

In some of these embodiments, an amount of the aromatic amine ranges from 2 to 4, % by weight of the total weight of the first and second formulations.

In some of these embodiments, an amount of the photoinitiator ranges from 0.5 to 1.5%, by weight, of the total weight of the first and second formulations.

In exemplary embodiments, the first formulation comprises:

a first curable material being a cyanate ester as described herein in any of the respective embodiments, in an amount of from 90 to 99% by weight of the total weight of the first formulation; and a photoinitiator, as described herein in any of the respective embodiments, in an amount of from 0.5 to 3, or from 1 to 2, 5 by weight of the total weight of the first formulation.

In exemplary embodiments, the second formulation comprises:

One or more multi-functional acrylic material(s) that feature, when hardened, an average Tg of at least 150° C., in a total amount of 86 to 95% by weight of the total weight of the second formulation; and an aromatic amine (primary, secondary or a mixture thereof) in a total amount of 5 to 10, % by weight of the total weight of the second formulation.

In some of these exemplary embodiments, the first and second formulations are dispensed at a ratio that ranges from 60:40 to 70:30 (First formulation: Second formulation).

In some of these exemplary embodiments, the second formulation further comprises a metal catalyst as described herein, in an amount as described herein.

In some of these embodiments, an amount of the metal catalysts is no more than 1000 ppm or no more than 500 ppm of the total weight of the first and second formulations.

In exemplary embodiments, the first formulation is as described in the exemplary embodiments herein and the second formulation comprises:

One or more multi-functional acrylic material(s) that feature, when hardened, an average Tg of at least 150° C., in a total amount of 40 to 60% by weight of the total weight of the second formulation;

an aromatic amine (primary, secondary or a mixture thereof) in a total amount of 3 to 8, % by weight of the total weight of the second formulation; and an epoxy-containing curable material as described herein in any of the respective embodiments, in an amount of 30 to 50, % by weight, of the total weight of the second formulation.

In some of these exemplary embodiments, the first and second formulations are dispensed at a ratio that ranges from 60:40 to 40:60, or of 50:50 (First formulation: Second formulation).

In some of these exemplary embodiments, the second formulation further comprises a metal catalyst as described herein, in an amount as described herein.

In some of these embodiments, an amount of the metal catalysts is no more than 1000 ppm or no more than 500 ppm of the total weight of the first and second formulations.

In some of any of the embodiments described herein the first formulation is devoid of the additional curable material.

In some of any of the embodiments described herein, a total amount of the first curable material and the additional curable material, if present, ranges from 50 to 80, or from 60 to 80, or from 60 to 70, %, by weight, of the total weight of the at least two formulations.

In some of any of the embodiments described herein, the method is effected such that in at least some of the layers, the dispensing is of the first and the second formulations, and in some embodiments, the first and second formulations are dispensed in a voxelated manner, as described herein.

In some of these embodiments, a weight ratio of the first and second formulations in each voxel ranges from about 80:20 to about 20:80 or from about 70:30 to 30:70, or from about 70:30 to 50:50, including any intermediate values and subranges therebetween.

In some of embodiments, a total weight ratio of the first and second formulations in the plurality of layers ranges from about 80:20 to about 20:80 or from about 70:30 to 30:70, or from about 70:30 to 50:50, including any intermediate values and subranges therebetween.

At the end of the dispensing, a green body made of a plurality of layers is obtained, as shown, for example, in FIG. 7. In some embodiments, the green body comprises a polymerized second curable material and a non-polymerized or partially polymerized cyanate ester. The green body is optionally and preferably subjected to a second curing condition, as described herein, to effect polymerization of the cyanate ester to a higher degree, for example, to at least 70%, or at least 80%, or at least 90%, to thereby obtain the final object.

In some of any of the embodiments described herein, a formulation as described herein is relatively stable when each formulation is stored separately, even at elevated temperatures, such that a change in the formulation's viscosity during storage is minimal or null (e.g., less than 1% per day).

In some of any of the embodiments described herein, when the two formulations are mixed with one another, the rate at which the viscosity increases correlates to the temperature at which the formulation system, when mixed, is maintained. In some embodiments, at 25° C., a viscosity increase rate is less than 1%/minute. At 40° C., a viscosity increase rate of less than 2%/minute or less than 1.5%/minute. At 68° C., a viscosity increase rate is less than 50%/minute, e.g., of 30-40%/minute.

In some of any of the embodiments described herein, the method further comprises dispensing a third formulation, such that the formulation system described herein (of at least the first and second formulations) forms an inner region which is at least partially encompassed or enveloped by the third formulation.

In some embodiments, the third modeling material formulation comprises a third curable material which is curable upon exposure to the first curing condition, for example, one or more UV-curable materials such as acrylic materials.

In some embodiments, the third formulation comprises a photoinitiator or any other agent that promotes hardening thereof when exposed to the first curing condition, in an amount sufficient to promote hardening of the third formulation to higher degree than that of the formulation system that comprises the first and the second modeling formulations as described herein.

Reference is now made to FIGS. 11A and 11B showing simplified schematic drawings of a cross sectional view of an object fabricated with a core filled with a formulation system as described herein encompassed by a shell formed with a third formulation as described herein and a top view of single layer of the object respectively, both in accordance with some example embodiments. According to some example embodiments, an object 112 may include a core 210 that is formed with a formulation system as described herein and a shell 220 formed with a third modeling material formulation that is configured to be fully cured during the AM process. Optionally, one or more support structures 115 may be formed to support object 112. The support structure may be solidified by curing during the AM process. According to some example embodiments, core 210 is maintained in a semi-solidified state, e.g. liquid-jelly state during the AM process while shell 220 is solidified during the AM process.

Referring now to FIG. 11B, according to some example embodiments, during the AM process, a layer 113 may be printed with an outer region 221 formed with the third formulation that may define a perimeter of layer 113 and an inner region 211 formed with the formulation system of the present embodiments partially encompassed by outer region 221. According to some example embodiments, a plurality of layers that form object 112 are formed in a manner similar to layer 113 including both outer region 221 and inner region 211. The plurality of layers may optionally form shell 220 and core 210. Shell 220 may be defined to encapsulate core 210. In other example embodiments, object 112 may not be fully encapsulated by shell 220. A thickness of outer region

221 may be defined to have a thickness of one printed voxel or a thickness of 0.1-2 mm, e.g. 0.3-1 mm or 0.3 mm.

Optionally, the third formulation applied to form outer region 221 is reactive and includes a photo-initiator. As such the third building material formulation solidifies based on a curing process, e.g. UV radiation radiated during the AM process. In some example embodiments, inner region 211 formed with the formulation system of the present embodiments and includes at least a portion thereof that is only partially cured. Rather, core 210 formed with a plurality of inner regions 211 may be solidified in a post treatment process, e.g. thermal curing process.

FIG. 12 is a simplified flow chart of an example in accordance with some example embodiments. According to some example embodiments, a data processor associated with an inkjet printing system is configured to receive object data and define geometry of a shell around the object (block 310). Defining geometry of the shell may include defining a thickness of the shell. Optionally the thickness may be selectively defined to vary based on the geometry of the object. The shell may be part of a volume of the object or may be external to the object and configured to be removed at the end of the AM process. In some example embodiments, a degree of desired solidification in the core may also be defined, for example, by defining the weight ratio of the first and second formulations (block 320). The degree of solidification of the core may be selectively defined based on adding a vol. % of the reactive formation in the core.

In some example embodiments, the model of the object including the defined shell and core is divided into printable layers (block 330). During printing, the printer selectively deposits the formulation system, the third formulation and optionally a support material per layer (block 340). Optionally, the layer is leveled (block 350) and then exposed to the first curing condition (block 360). This process may continue until all the layers are built (block 370). At the end of the layer building process, exposure to a second curing condition (e.g., thermal post treatment) (block 380) may be performed to complete solidification of the object, e.g. the core. Thermal post treatment may include for example heating the object for 1-10 hours at a temperature of from 80° C. to 250° C., or from 150° C. to 250° C. Thermal post treatment can be performed gradually, by heating to a first temperature in the above-indicated range for a first time period (e.g., 1-4 hours) and then to a second temperature, higher than the first temperature for a second time period (e.g., 1-4 hours) and optionally to a third, fourth, etc. temperature, for additional time periods. The support material when present may be removed before or after the exposure to the second curing condition (block 390).

FIG. 13 is a simplified block diagram of an example ink-jet printing system for three-dimensional printing in accordance with some example embodiments. According to some example embodiments, an ink-jet printing system 200 may be similar to inkjet system 100 but with a plurality of adaption to configure the system for printing with materials according to the present embodiments. According to some example embodiments, preferably a building material supply system or apparatus 130' contains at least one container or cartridge with a first formulation, another container or cartridge with a second formulation and another container or cartridge with a third formulation. According to some example embodiments, a data processor 154' is configured to obtain computer object data and to compute digital data defining a shell and a core of object 112. A thickness of the shell may be defined with data process 154' based on the shape of object 112, size of object 112 and material selected to fabricate object 112. In some example embodiments, parameters for interlacing the first and the second formulations as described herein in the core are also defined by data processor 154' also based on the shape of object 112, size of object 112 and material selected to fabricate object 112. Parameters may include vol. % of the formulations in each voxel and/or layer. According to some example embodiments, ink-jet printing system 200 additionally includes a heating chamber 190 configured for receiving object 112 printed with inkjet printer 114 and post treating the object at the end of the AM process with inkjet printer 114.

According to some embodiments of the present invention, in at least a portion of the dispensed layers, the formulation system and the third formulation are dispensed as described herein, and exposed to a first curing condition. The formulation system and the third formulation and the first curing condition are selected such that upon exposure to the first curing condition, the third formulation is hardened to a higher degree than the formulation system. The formulation system and the third formulation and the first curing condition are selected such that upon exposure to the first curing condition, the third formulation provides a hardened material having a high hardening degree, whereby the formulation system undergoes hardening of only the second curable material and provides a material with a hardening degree that is lower than that provided by the third formulation.

According to some embodiments of the present invention, the formulation system and the third formulation and the first curing condition are selected such that upon exposure to the first curing condition, a hardening kinetic parameter of the third formulation is higher than that of the formulation system. In some embodiments, the hardening kinetic parameter is a rheological kinetic parameter such as a rate of a change in the viscosity of the formulation, and/or a rate of a change in the tan δ of the formulation. These kinetic parameters can be measured by methods known to those skilled in the art.

In some embodiments, a hardening kinetic parameter of the third formulation is higher than that of the formulation system by at least 2-folds, or at least 5-folds, or at least 10-folds.

A rate of the change of viscosity can be measured by measuring the viscosity of a formulation at a constant temperature and when exposed to the first curing condition at different time points. Viscosity can be measured, for example, on a Brookfield viscometer.

By "Tan δ", which is also known and used in the art as "tan delta", "tangent delta", "loss tangent", it is meant a ratio of loss modulus to storage modulus, or the tangent of the phase lag between the stress and the strain.

In some of any of the embodiments described herein, upon exposure to the first curing condition, the third formulation provides a material that features a hardening degree, as defined herein, that is higher by at least 50%, or at least 60%, or at least 70%, or at least 80%, or at least 90%, or more, than a hardening degree of a material that is formed upon exposing the formulation system to the first curing condition.

In some of any of the embodiments described herein, the third formulation is such that provides, upon exposure to the first curing condition, a hardening degree, as defined herein, of at least 50%, or at least 60%, preferably at least 70%, or at least 80%, or at least 90%, or even 100%. For example, in some embodiments, the third formulation comprises one or more curable materials which are polymerizable materials, and the hardening degree represents the mol % of the curable materials that polymerize upon exposure to the curing condition, such that at least 50 mol %, or at least 60 mol %, preferably at least 70 mol %, or at least 80 mol %, or at least 90 mol %, or all of the polymerizable materials, undergo polymerization to thereby provide a hardened third formulation. Since the third formulation undergoes a high degree of hardening when exposed to the first curing condition, it is referred to herein as a reactive formulation, that is, the third formulation is reactive towards hardening when exposed to the first curing condition.

In some of any of the embodiments described herein, the formulation system is such that provides, upon exposure to the first curing condition, a total hardening degree, as defined herein, of no more than 50%, or no more than 40%, preferably no more than 30%, or no more than 20%, or no more than 10%, or no more than 5%, or even null. For example, the formulation system comprises a first curable material which is a cyanate ester and a second curable material as defined herein, and the hardening degree represents the mol % of the total curable materials that polymerize upon exposure to the curing condition, such that at no more than 50 mol %, or no more than 40 mol %, preferably no more than 30 mol %, or no more than 20 mol %, or no more than 10 mol %, or no more than 5 mol %, or none, of the polymerizable materials, undergo polymerization. Since the first curable material undergoes a low or null degree of polymerization when exposed to the first curing condition, it is referred to herein as partially-reactive formulation, that is, the formulation system is partially-reactive towards hardening when exposed to the first curing condition.

A hardening degree as defined herein can be determined or measured, for example, by determining a hardening parameter of the formulation system and the third formulation when exposed to the first curing condition.

The hardening parameter can be, for example, a rheological parameter such as the viscosity of the formulation upon exposure to the first curing condition, and/or the loss tangent (tan δ) of the formulation upon exposure to the first curing condition.

According to some embodiments of the present invention, the formulation system and the third formulation and the first curing condition are selected such that upon exposure to the first curing condition, a change in a hardening parameter of the third formulation is higher than a change in a hardening parameter of the formulation system.

By "a change in a hardening parameter" in the context of "upon exposure to the first curing condition" it is meant a change in a hardening parameter, as described herein, during the time T, wherein T represents that time period from when the first curing condition is applied to a dispensed layer and until the following layer is dispensed.

According to some embodiments of the present invention, the formulation system and the third formulation and the first curing condition are selected such that upon exposure to the first curing condition, a change in a viscosity of the third formulation is higher than a change in a viscosity of the formulation system.

According to some of these embodiments, a change in the viscosity of the third formulation is higher than that of the formulation system by at least 2-folds, or at least 5-folds, or at least 10-folds.

According to some of these embodiments, a change in the viscosity of the third formulation during the time T as defined herein is at least 2-folds, such that the viscosity of the third formulation increases by at least 2-folds or by at least 5-folds or by at least 10-folds. According to some of these embodiments, a change in the viscosity of the formulation during the time T as defined herein is null, that is 1-folds, or is lower than 2-folds, and can be, for example, 1.1, 1.2, 1.3, 1.4 or 1.5-folds.

According to some embodiments of the present invention, the formulation system and the third formulation and the first curing condition are selected such that upon exposure to the first curing condition, a change in a loss tangent of the third formulation is higher than a change in a loss tangent of the formulation system.

According to some of these embodiments, a change in the loss tangent of the third formulation is higher than that of the formulation system by at least 2-folds, or at least 5-folds, or at least 10-folds.

According to some of these embodiments, a change in the loss tangent of the third formulation during the time T as defined herein is of at least one unit, such that the loss tangent of the third formulation increases by at least one unit, or at least 2 units, or more. According to some of these embodiments, a change in the loss tangent of the formulation system during the time T as defined herein is null, or is lower than one unit, or lower than 0.5 units, and can be, for example, 0.1, 0.2, 0.3, 0.4 or 0.5 units.

In some of any of the embodiments described herein, the third formulation hardens when exposed to the first curing condition, and the formulation system hardens to a lesser degree, as described herein, when exposed to the first condition and hardens or hardens further when exposed to a second curing condition that is different from the first curing condition. It is to be noted that in some embodiments, the third formulation can further harden when exposed to the second curing condition.

In some of any of the embodiments described herein, the first curing condition is optical radiation, as described herein, for example, a UV radiation, and the second curing condition is heat, as described herein.

Any formulation that provides a hardening degree as defined herein compared to the formulation system can be used as the third formulation that forms the outer region as described herein.

In exemplary embodiments, the third formulation comprises one or more UV-curable materials and a photoinitiator, as described herein.

In some embodiments, the third formulation provides, when hardened, a relatively high HDT material (e.g., HDT higher than 100° C.). An exemplary third formulation is RGD515™ available by Stratasys® Ltd., Israel. Optionally, RGD515™ provides improved impact resistance.

In some of any of the embodiments described herein, the first and/or second and/or third formulation independently further comprises one or more additional materials, which are referred to herein also as non-reactive materials (non-curable materials).

Such materials include, for example, surface active agents (surfactants), inhibitors, antioxidants, fillers, pigments, dyes, and/or dispersants.

Surface-active agents may be used to reduce the surface tension of the formulation to the value required for jetting or for printing process, which is typically around 30 dyne/cm. Such agents include silicone materials, for example, organic polysiloxanes such as PDMS and derivatives therefore, such as those commercially available as BYK type surfactants.

Suitable dispersants (dispersing agents) can also be silicone materials, for example, organic polysiloxanes such as PDMS and derivatives therefore, such as those commercially available as BYK type surfactants.

Suitable stabilizers (stabilizing agents) include, for example, thermal stabilizers, which stabilize the formulation at high temperatures.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a concentration of each of a surfactant and/or a dispersant and/or a stabilizer and/or a filler, if present, ranges from 0.01 to 2%, or from 0.01 to 1%, by weight, of the total weight of the respective formulation. Dispersants are typically used at a concentration that ranges from 0.01 to 0.1%, or from 0.01 to 0.05%, by weight, of the total weight of the respective formulation.

In some embodiments, the first and/or second and/or third formulation further comprises an inhibitor. The inhibitor is included for preventing or reducing curing before exposure to a curing condition. Suitable inhibitors include, for example, those commercially available as the 'Genorad' type, or as MEHQ. Any other suitable inhibitors are contemplated.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nanosized carbon black.

In some embodiments, the pigment's concentration ranges from 0.1 to 2% by weight, or from 0.1 to 1.5%, by weight, of the total weight of the respective formulation.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein there is provided a kit comprising one or more of the modeling material formulation(s) composing the formulation system, as described herein in any of the respective embodiments and any combination thereof.

In some embodiments, when the kit comprises a formulation system comprising two or more formulations, as described herein in any of the respective embodiments and any combination thereof, each formulation is packaged individually in the kit.

In some embodiments, the kit further comprises a third formulation as described herein, or instructions to use the formulation system in combination with the third formulation.

In exemplary embodiments, the formulations are packaged within the kit in a suitable packaging material, preferably, an impermeable material (e.g., water- and gas-impermeable material), and further preferably an opaque material.

In some embodiments, the kit further comprises instructions to use the formulations in an additive manufacturing process, preferably a 3D inkjet printing process as described herein. The kit may further comprise instructions to use the formulations in the process in accordance with the method as described herein.

Embodiments of the present invention provide three-dimensional objects comprising in at least a portion thereof a polycyanurate material, as defined herein.

According to some embodiments, the three-dimensional objects are prepared by a method as described herein in any of the respective embodiments.

According to some embodiments, the polycyanurate material in the object is characterized by high HDT (as this term is defined herein), e.g., HDT higher than 200° C., or higher than 250° C., or higher.

It is expected that during the life of a patent maturing from this application many relevant curable materials and/or respective agents for promoting polymerization of curable materials will be developed and the scope of the terms first curable material, second curable material and agents promoting polymerization thereof is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein and in the art, Storage Modulus (E') is defined according to ISO 6721-1, as representing a stiffness of a material as measured in dynamic mechanical analysis, and is proportional to the energy stored in a specimen during a loading cycle. In some embodiments, the Storage Modulus is determined as described in the Examples section that follows. In some embodiments, the Storage Modulus is determined according to ASTM D4605.

Herein, "Tg" refers to glass transition temperature defined as the location of the local maximum of the E" curve, where E" is the loss modulus of the material as a function of the temperature. Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

In any of the embodiments described herein, the term "temperature higher than Tg" means a temperature that is higher than the Tg temperature, or, more preferably a temperature that is higher than Tg(high).

As used herein, HDT refers to a temperature at which the respective material deforms under a predetermined load at some certain temperature. Suitable test procedures for determining the HDT of a material are the ASTM D-648 series, particularly the ASTM D-648-06 and ASTM D-648-07 methods. In some embodiments, HDT is determined at a pressure of 0.45 MPa.

Herein throughout, the term "(meth)acrylic" encompasses acrylic and methacrylic materials.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 30, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group. Dimethylenecyclohexane is an example of a hydrocarbon comprised of 2 alkyl groups and one cycloalkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein. The term alkoxide describes—R'O⁻ group, with R' as defined herein.

The term "aryloxy" describes both an —O-aryl and an —O-heteroaryl group, as defined herein.

The term "thiohydroxy" or "thiol" describes a —SH group. The term "thiolate" describes a —S⁻ group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO₂ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'-linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)— NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Methods

Formulation Systems—General:

Exemplary formulation systems according to some embodiments of the present invention are composed of two modeling material formulations, one formulation (Part A, corresponding to a second modeling formulation as described herein) includes a high Tg acrylic photocurable material (a second curable material), and containing an agent that promotes curing of a cyanate ester-based thermoscurable material, and another formulation (Part B, corresponding to a first modeling formulation as described herein) includes a cyanate ester-based thermos-curable material (a first curable material) and optionally a photoinitiator that promotes curing of the photocurable material. Each formulation optionally further comprises surface active agents, inhibitors, and additional activators.

All reagents and materials composing the tested formulations were obtained from known vendors.

Formulations were prepared by mixing the components at a temperature ranging from room temperature to about 80° C., depending on the Tm (melting temperature) of the components. In an exemplary procedure, all components that are liquid at room temperature, except from an agent that promotes curing of the cyanate ester curable material, if present in the formulation, are mixed at room temperature, solid component(s) are added and the mixture is heated to a temperature of up to about 80° C. While heating at a higher temperature is contemplated, it has been observed that such a heating may reduce the formulation's stability. The mixture is then cooled to room temperature and the agent that promotes curing of the cyanate ester curable material, if present in the formulation, is then added.

3D Inkjet Printing:

Experiments were conducted using Connex™ and Triplex printing system, equipped with E1 printing heads, operated at inkjet printing head working temperature in a range of from about 40 to about 100° C., depending on the temperature-dependent viscosity profile of the formulation(s). In typical experiments, printing was performed at inkjet printing heads temperature of about 68° C.

Unless otherwise indicated, the models were printed in chess ("side by side") 50:50 digital mode (DM), which allows homogeneous mixing of Part A and Part B on the tray, as illustrated in FIGS. 6A and 6B.

In some cases, models were printed in digital mode using a weight ratio of from 30:70 to 40:60 (e.g., 30:70 or 37.5:62.5) of Part B to Part A.

In some cases, printing was performed while forming an inner region made of the two formulations described herein, in DM, and an outer coating, typically of 0.1-0.5 mm thickness, made of an acrylic-based formulation as described herein.

Curing:

An exemplary first curing condition comprises irradiation using a standard medium pressure mercury lamp with broad wavelength spectrum—from 250 up to 380 nm, and light intensity (total) of about 1.4 W/cm$^2$. Time of printing head pass above curing layer is few milliseconds, at ambient temperature of 35-50° C.

Thermal curing (curing by exposure to heat energy) was performed in a standard laboratory/industrial heating oven, at a temperature of from about 80 to about 250° C. (the upper limit depends on the Tg of the cured material), for 1-10 hours, typically 2-6 hours. In an exemplary procedure heating was effected for 2-4 hours at 85° C., then 2-4 hours at 150° C. and then 2-4 hours at 220° C.

Characterization:

Viscosity was measured using Brookfield's LVDV-II+ viscometer.

HDT measurements were performed on Ceast vicat/HDT instrument according to ASTM D-648-06.

Measurements of other properties were performed according to standard protocols, unless otherwise indicated.

Example 1

Table 1 below presents the composition of an exemplary Part A formulation, and Table 2 below presents the composition of an exemplary Part B formulation.

TABLE 1

Part A

| Component | Wt. % |
|---|---|
| Thiol-containing activator for CE curing | 10-20 (e.g., 10-15) |
| Difunctional methacrylate monomer featuring Tg >150° C. | 65-85 (e.g., 80-85) |
| Trifunctional acrylate oligomer featuring Tg >150° C. | 1-20 (e.g., 1-10) |
| Polymerization inhibitor | 0.1-2 |
| Surface active agent | 0.01-0.1 |
| Photoinitiator | 0.1-1 |
| Acidic Additive (pH adjusting agent) | 0.010-0.050 phr |

Properties

| Visc. (68° C.) | 17.8 cP |
|---|---|
| Surface Tension | 30 dyne/cm |

TABLE 2

Part B

| Component | Wt. % |
|---|---|
| Cyanate ester resin | 95-99 |
| Surface active agent | 0.05-0.5 (e.g., 0.1-0.2) |
| Photoinitiator | 1-2 (e.g., 1.5-2) |

Properties

| Visc. (68° C.) | 23 cP |
|---|---|
| Surface Tension | 33 dyne/cm |

An exemplary photoinitiator that may be used in these and other embodiments is a combination of ITX-2 and Irgacure I369). ITX-2 is Isopropylthioxanthone Norrish type II Photoinitiator which absorbs irradiation at long wavelengths (360-400 nm), and which is activated by hydrogen radicals that are generated from I369.

Bars having the following dimensions: 64×12.7×3.2 mm (according to ASTM D256), were printed, using RGD 515+ as a third formulation as described herein, as shown in FIG. 14. Table 3 below presents the mechanical properties of the printed bar objects.

TABLE 3

| HDT (0.45 MPa) | 216 |
|---|---|
| HDT (1.82 MPa) | 192 |
| E' (MPa) | 2350 |
| Tg (Tan δ, ° C.) | 230 |
| Tensile Strength (MPa) | 52 |
| Elongation (%) | 3 |
| Flexural Strength (MPa) | 112 |
| Flexural Modulus (MPa) | 3750 |
| Izod Notched Impact (J/m) | about 18 |

Example 2

Table 4 below presents the composition of an exemplary Part A formulation, and Table 5 below presents the composition of an exemplary Part B formulation.

TABLE 4

Part A

| Component | Wt. % |
|---|---|
| Aromatic amine-containing activator for CE curing | 5-10 |
| Difunctional methacrylate monomer featuring Tg >150° C. | 65-75 (e.g., 70-75) |
| Trifunctional acrylate oligomer featuring Tg >150° C. | 10-30 (e.g., 15-25) |
| Surface active agent | 0.01-0.1 |

Properties

| Visc. (68° C.) | about 18.5 cP |
|---|---|
| Surface Tension | about 29 dyne/cm |

TABLE 5

Part B

| Component | Wt. % |
|---|---|
| Cyanate ester resin | 95-99 |
| Surface active agent | 0.05-0.5 (e.g., 0.1-0.3) |
| Photoinitiator | 1-2 |

Properties

| Visc. (68° C.) | 20.7 cP |
|---|---|
| Surface Tension | 28 dyne/cm |

Objects of variable shapes were printed, as shown in FIG. 15, in DM mode 37.5/62.5 ratio with RGD515+ coating at a thickness of 0.3 mm (as a third formulation as described herein. Table 6 below presents the mechanical properties of the printed bar objects.

TABLE 6

| | CE-based object | CE-based object + RGD515 + coating |
|---|---|---|
| HDT (0.45 MPa) | 255 | about 250 |
| HDT (1.82 MPa) | 216 | NA |
| E' (MPa) | 3000 | 2300 |
| Tg (° C.) | 260 | 260 |
| Tensile Strength (MPa) | ND | 75-85 |
| Elongation (%) | ND | 5-6 |
| Flexural Strength (MPa) | 150 | 100 |
| Flexural Modulus (MPa) | 3700 | 2200 |

TABLE 6-continued

| | CE-based object | CE-based object + RGD515 + coating |
|---|---|---|
| Izod Notched Impact (J/m) | about 20 | about 100 |

Example 3

Viscosity Measurements

Generally, for testing the stability of the Part A and Part B formulations, the formulations were prepared, preferably at room temperature, stored at 65° C., and the viscosity of each formulation was measured every day at 68° C.

An exemplary part B formulation (e.g., as depicted in Tables 2 and 5) was tested during 4 days storage and no change in its viscosity was observed.

An exemplary part A formulation as depicted in Table 4 (containing an aromatic amine activator) was tested during 4 days storage and no change in its viscosity was observed.

An exemplary part A formulation as depicted in Table 7 below (containing a thiol activator) was tested during 14 days storage and no change in its viscosity was observed, as demonstrated in Table 8 below and in FIG. 16.

The stability of the formulation as measured in these tests, during 14 days, is indicative of a stability of the formulation when stored at room temperature of 8 months.

TABLE 7

| Part A | |
|---|---|
| Component | Wt. % |
| Thiol-containing activator for CE curing | 10-15 |
| Difunctional methacrylate monomer featuring Tg >150° C. | 70-80 |
| Trifunctional acrylate oligomer featuring Tg >150° C. | 10-20 |
| Polymerization inhibitor | 0.1-1 phr |
| Surface active agent | 0.01-0.1 phr |
| Photoinitiator | 0.1-1 phr |
| antioxidant | 0.1 phr |

TABLE 8

| Day | Visc., cP |
|---|---|
| 0 | 19 |
| 1 | 19.05 |
| 2 | 19.1 |
| 5 | 18.9 |
| 6 | 19 |
| 7 | 19 |
| 8 | 19.2 |
| 9 | 19.1 |
| 13 | 19.3 |
| 14 | 19.2 |

It is to be noted that when a mixture of exemplary Part A and Part B formulations as shown in Example 1 herein was tested under the same conditions, an increase in viscosity was observed after 14 hours, when the mixture gelled.

Table 9 below and FIG. 17 present viscosity measurements of a mixture of exemplary Part A and Part B formulations as shown in Example 2 herein, at various temperatures.

As shown therein, the rate at which the viscosity increases correlates to the temperature, indicating a temperature-dependant curing rate. At 25° C., a viscosity increase rate of about 27%/30 minutes, which is less than 1%/minute was observed. At 40° C., a viscosity increase rate of about 35%/30 minutes, which is about 1.2%/minute was observed. At 68° C., a viscosity increase rate of about 100%/30 minutes, which is about 33%/minute, was observed.

Example 4

A formulation system in which Part A includes, as an agent that promotes polymerization of the cyanate ester, a combination of a metal catalyst and an aromatic secondary amine, was used.

While an aromatic secondary amine is advantageous due to its improved stability (it is less prone to oxidation) and hydrophobicity (which accounts for reduced water absorption of the formed green body and object), such an agent is also less reactive in prompting polymerization of a cyanate ester. Thus, a combination of such an agent with a metal catalyst that is usable in polymerization of cyanate esters was used.

As an exemplary metal catalyst, zinc neodecanoate (manufactured by Alfa Aesar) was used.

As an exemplary aromatic secondary amine, Ethacure 420 (manufactured by Albemarle) was used.

Table 9 below presents the composition of an exemplary Part A formulation, and Table 10 below presents the composition of an exemplary Part B formulation.

TABLE 9

| Component | Wt. % |
|---|---|
| Difunctional methacrylate monomer featuring Tg >150° C. | 60-80 (e.g., 70-75) |
| Secondary amine-containing activator for CE curing | 5-15 (e.g., 5-10) |
| Metal catalyst | 0.1-0.2 |
| Surface active agent | 0.01-0.1 |
| Trifunctional acrylate oligomer featuring Tg >150° C. | 10-30 (e.g., 15-25) |
| Antioxidant | 0.01-0.1 |

TABLE 10

| Component | Wt. % |
|---|---|
| Cyanate ester resin | 95-99 |
| Surface active agent | 0.05-0.5 (e.g., 0.1-0.3) |
| Photoinitiator | 1-2 |

The viscosity of the above Part A and Part B formulations at 68° C., is 16.3 centipoises and 20 centipoises, respectively, and the surface tension is 29 dyne/cm and 28 dyne/cm, respectively.

A similar formulation system was also prepared and practiced, using an aromatic amine featuring primary amine group(s) (e.g., Ethacure 100 or Ethacure 320).

These formulation systems were used according to a method as described herein, using a weight ratio of 30:70 (Part A: Part B), as described herein, and exhibited an improved reactivity compared to the formulations described in Examples 1 and 2 herein.

The improved reactivity was observed by the time required to obtain a material that features a Tg higher than 85° C. when the mixture of the two formulations or a green body obtained therefrom is subjected to heat (thermal curing) at 85° C. When such a time is one hour or less reactivity is considered to meet the requirements. When such a time is more than 2 hours, reactivity is considered to be inferior.

Objects made of this formulation system exhibited, upon exposure to the second curing condition (thermal curing) Tg of about 285° C. All other properties remain substantially the same as for the objects obtained in Examples 1 and 2 herein.

Example 5

A formulation system in which Part A includes, as an agent that promotes polymerization of the cyanate ester, a combination of a metal catalyst and an aromatic secondary amine, and further includes an epoxy resin, was used.

Epoxy resins are known to interact with cyanate esters to form a co-polymeric network. Any one or combination of epoxy resins known in the art to participate in co-polymerization with cyanate esters are contemplated, including aromatic, aliphatic and cycloaliphatic epoxide-containing materials, and further including each of the above which is mono-functional or multi-functional, as defined herein.

As an exemplary metal catalyst, zinc neodecanoate (manufactured by Alfa Aesar) was used.

As an exemplary aromatic secondary amine, Ethacure 420 (manufactured by Albemarle) was used.

As an exemplary epoxy resin (epoxy-containing curable material) a cycloaliphatic di-functional epoxide, which features a viscosity lower than 500 cps at room temperature, such as, for example, marketed by Lambson under the tradename IndigotS105, was used.

Table 11 below presents the composition of an exemplary Part A formulation, and Table 12 below presents the composition of an exemplary Part B formulation.

TABLE 11

| Component | Wt. % |
| --- | --- |
| Difunctional methacrylate monomer featuring Tg >150° C. | 30-50 (e.g.. 35-45) |
| Secondary amine-containing activator for CE curing | 1-10 |
| Metal catalyst | 0.05-0.15 |
| Cycloaliphatic di-functional Epoxy resin | 30-50 (e.g., 35-45) |
| Surface active agent | 0.01-0.1 |
| Trifunctional acrylate oligomer featuring Tg >150° C. | 10-20 (e.g., 10-15) |
| Antioxidant | 0.01-0.1 |

TABLE 12

| Component | Wt. % |
| --- | --- |
| Cyanate ester resin | 95-99 |
| Surface active agent | 0.05-0.5 (e.g., 0.1-0.3) |
| Photoinitiator | 1-2 |

The viscosity of the above Part A and Part B formulations at 68° C., is 18.7 and 20 centipoises, respectively, and the surface tension of both is 28 dyne/cm.

This formulation system was used according to a method as described herein, at a weight ratio of 50:50 (Part A: Part B), as described herein, and exhibited an improved reactivity (as described herein) compared to the formulations described in Examples 1 and 2 herein.

Objects made of this formulation system exhibited Tg of about 255° C. All other properties remain substantially the same as for the objects obtained in Examples 1 and 2 herein.

The formulation systems described in this example provide 3D objects which feature water absorbance that is lower than that typically observed for objects made of a cyanate ester-containing polymeric network.

Herein throughout and in the art, the phrase "water absorption", which is used herein and in the art interchangeably as "water absorbance", whereby both these phrases are abbreviated herein as WA, describes an amount of water that a material is capable of absorbing, relative to its weight, when immersed in water at room temperature, for 24 hours. Water absorption of a sample can be determined according to ASTM D57098.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A kit comprising at least a first modeling material formulation and a second modeling material formulation, said first modeling material formulation comprising a first curable material which is a thermally-curable cyanate ester and said second modeling material formulation comprising an activating agent for promoting polymerization of said cyanate ester and is devoid of said first curable material, the at least first and second modeling material formulations further comprising a second curable material being different from said first curable material, and optionally an agent for promoting hardening of said second curable material, said at least first and second modeling material formulations being for use in additive manufacturing of a three-dimensional object that comprises, in at least a portion thereof, a cyanate ester-containing polymeric network.

2. The kit of claim 1, wherein said first and said second modeling material formulations are separately packaged within the kit.

3. The kit of claim 1, wherein said first formulation comprises said first curable material and said agent for promoting polymerization of said second curable material.

4. The kit of claim 1, wherein said second formulation comprises said second curable material and said agent for promoting polymerization of said cyanate ester.

5. The kit of claim 1, wherein said second curable material is a photocurable material, and said agent for promoting hardening of said second curable material is a photoinitiator.

6. The kit of claim 5, wherein said photocurable material features, when hardened, Tg of at least 150° C.

7. The kit of claim 1, wherein said second curable material is or comprises an acrylic material.

8. The kit of claim 7, wherein said acrylic material comprises a di-functional and/or a multi-functional acrylic material.

9. The kit of claim 1, wherein said agent for promoting polymerization of said cyanate ester is inactive or is partially active towards promoting polymerization of said cyanate ester when in the kit.

10. The kit of claim 9, wherein said at least first and second modeling material formulations further comprise an agent that activates said agent for promoting polymerization of said cyanate ester.

11. The kit of claim 1, wherein said agent for promoting polymerization of said cyanate ester comprises a nucleophilic group.

12. The kit of claim 11, wherein said nucleophilic group is thiol or amine.

13. The kit of claim 1, wherein said agent for promoting polymerization of said cyanate ester is an aromatic amine.

14. The kit of claim 1, wherein said agent for promoting polymerization of said cyanate ester is an aromatic secondary amine.

15. The kit of claim 1, wherein said second formulation further comprises a metal species that promotes polymerization of said cyanate ester.

16. The kit of claim 1, wherein said at least first and second modeling material formulations further comprise an additional curable material which is capable of interacting with said cyanate ester to thereby form a co-polymeric network.

17. The kit of claim 16, wherein said additional curable material is or comprises an epoxy-containing curable material.

18. The kit of claim 16, wherein said additional curable material features a viscosity lower than 1,000, or lower than 500, centipoises, at room temperature.

19. The kit of claim 5, wherein said first formulation comprises said first curable material and said photoinitiator and said second formulation comprises a multi-functional acrylic material that features, when hardened, a Tg of at least 150° C., and an aromatic amine.

20. The kit of claim 19, wherein a total amount of said multi-functional acrylic material ranges from 20 to 40, or from 20 to 30, or from 25 to 30, % by weight, of the total weight of said first and second formulations.

21. The kit of claim 19, wherein an amount of said aromatic amine ranges from 2 to 4, % by weight of the total weight of said first and second formulations.

22. The kit of claim 19, wherein an amount of said photoinitiator ranges from 0.5 to 1.5%, by weight, of the total weight of said first and second formulations.

23. The kit of claim 19, wherein said at least first and second modeling material formulations further comprise an additional curable material that is capable of interacting with said cyanate ester.

24. The kit of claim 23, wherein said first formulation is devoid of said additional curable material.

25. The kit of claim 23, wherein a total amount of said first curable material and said additional curable material, if present, ranges from 50 to 80, or from 60 to 80, or from 60 to 70, %, by weight, of the total weight of said first and second formulations.

* * * * *